United States Patent
Kobayashi et al.

(10) Patent No.: US 9,403,496 B2
(45) Date of Patent: Aug. 2, 2016

(54) COMMUNICATION SYSTEM, MOVABLE-BODY-MOUNTED APPARATUS, TERMINAL DEVICE, AND CENTER SERVER

(75) Inventors: Yuichi Kobayashi, Tokyo (JP); Katsuya Miyata, Tokyo (JP); Tetsuo Nakano, Tokyo (JP); Mitsuhiro Kitani, Tokyo (JP); Hirokazu Aoshima, Tokyo (JP); Noboru Kiyama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 33 days.

(21) Appl. No.: 14/114,849

(22) PCT Filed: Aug. 10, 2012

(86) PCT No.: PCT/JP2012/070506
§ 371 (c)(1),
(2), (4) Date: Feb. 3, 2014

(87) PCT Pub. No.: WO2013/035492
PCT Pub. Date: Mar. 14, 2013

(65) Prior Publication Data
US 2014/0172198 A1    Jun. 19, 2014

(30) Foreign Application Priority Data
Sep. 5, 2011  (JP) .................................. 2011-193035

(51) Int. Cl.
*B60R 16/023* (2006.01)
*H04M 1/725* (2006.01)
*G07C 5/00* (2006.01)
*G07C 5/08* (2006.01)

(52) U.S. Cl.
CPC ............ *B60R 16/0231* (2013.01); *G07C 5/008* (2013.01); *H04M 1/7253* (2013.01); *G07C 5/08* (2013.01)

(58) Field of Classification Search
CPC ...... B60R 16/0231; G07C 5/008; G07C 5/08; H04M 1/7253
See application file for complete search history.

(56) References Cited

U.S. PATENT DOCUMENTS

2003/0043019 A1   3/2003   Tanaka et al.
2005/0270152 A1   12/2005  Harumoto et al.
(Continued)

FOREIGN PATENT DOCUMENTS

| JP | 2001-077939 A | 3/2001 |
| JP | 2003-044989 A | 2/2003 |
| JP | 2005-297819 A | 10/2005 |

(Continued)

*Primary Examiner* — John Q Nguyen
*Assistant Examiner* — Jordan S Fei
(74) *Attorney, Agent, or Firm* — Volpe and Koenig, P.C.

(57) ABSTRACT

Provided is a communication system capable of enhancing convenience for remotely operating a movable-body-mounted apparatus mountable in a movable body such as a vehicle. For example, a communication system includes a movable-body-mounted apparatus including: a movable body information storage part which stores movable body information including a received signal quality of a radio wave used for communication to/from a center server and information on a vehicle; a separation determination part which determines whether or not a user who moves along with the vehicle is separated from the vehicle; and a movable body information notification part which notifies the user of the movable body information stored in the movable body information storage part when the separation determination part determines that the user is separated from the vehicle.

9 Claims, 16 Drawing Sheets

(56) References Cited

U.S. PATENT DOCUMENTS

| | | |
|---|---|---|
| 2009/0322558 A1 | 12/2009 | Videtich et al. |
| 2010/0148923 A1 | 6/2010 | Takizawa |
| 2011/0193721 A1 | 8/2011 | Koie et al. |

FOREIGN PATENT DOCUMENTS

| | | |
|---|---|---|
| JP | 2006-246327 A | 9/2006 |
| JP | 2007-266900 A | 10/2007 |
| JP | 2008-287491 A | 11/2008 |
| JP | 2009-003617 A | 1/2009 |
| JP | 2009-272992 A | 11/2009 |

MOVABLE BODY INFORMATION STORAGE PART 23

| ITEM | CONTENT | COLLECTION TIME |
|---|---|---|
| RECEIVED SIGNAL QUALITY | OUT OF COMMUNICATION AREA | 2011/8/25 19:12:13 |
| REMAINING AMOUNT OF ENERGY | 62% | 2011/8/25 19:12:01 |
| POSITION | (*, *) | 2011/8/25 19:11:40 |
| ⋮ | ⋮ | ⋮ |

COMMUNICATION SYSTEM, MOVABLE-BODY-MOUNTED APPARATUS, TERMINAL DEVICE, AND CENTER SERVER

INCORPORATION BY REFERENCE

This application claims priority to Japanese Patent Application No. 2011-193035 filed on Sep. 5, 2011, the entire contents of which are incorporated herein by reference.

TECHNICAL FIELD

The present invention relates to a technology of remotely controlling a movable-body-mounted apparatus mountable on a movable body such as a vehicle from a remote location by communicating to/from the movable-body-mounted apparatus via a center server.

BACKGROUND ART

Patent Literature 1 discloses a remote control method involving: a user can register a control content on an on-vehicle equipment, which she/he wishes, in advance, corresponding to an ID information into a remote control apparatus, by using a communication terminal different from the on-vehicle equipment, and, when using the on-vehicle equipment, the on-vehicle equipment transmits the ID information to the remote control apparatus and obtains a control content in accordance with the ID information and executes the processing in accordance with the obtained control content.

CITATION LIST

Patent Literature

[PTL 1] US 2003/0043019 A1

SUMMARY OF INVENTION

Technical Problem

By the way, according to Patent Literature 1, if the on-vehicle equipment is out of a range of a communication area, the on-vehicle equipment cannot communicate to/from the remote control apparatus, and cannot obtain the control content from the remote control apparatus. Therefore, even if the user selects the required control content and registers the content to the remote control apparatus in advance, the on-vehicle equipment cannot obtain the control content upon departure, and hence the user needs to directly operate the on-vehicle equipment to input the control content into the on-vehicle equipment.

A user interface of the on-vehicle equipment is not as easy to use as a general-purpose computer due to a restriction imposed on an installation area and the like, and thus input of information may require time. As a result, if it is found out that the on-vehicle equipment is out of the range of the communication upon departure, the departure may not be made on time. Moreover, if information on various facilities have been searched for, and various control contents have been registered to the remote control apparatus in advance, not all the retrieved information and control contents may be remembered upon departure. As a result, the information searched for in advance may be wasted.

The present invention has been made in view of the above-mentioned problems, and therefore has an object to enhance convenience for remotely operating a movable-body-mounted apparatus mountable on a movable body such as a vehicle.

Solution to Problems

In order to solve the above-mentioned problems, for example, a configuration as described in Claims is employed.

While this application includes a plurality of means for solving the problems, as one example thereof, there is provided a communication system, including:

a movable-body-mounted apparatus mountable on a movable body; and a terminal device to be used by a user who moves along with a movable body, in which:

the movable-body-mounted apparatus includes:

a first mobile body information storage part which stores movable body information including a received signal quality of a radio wave used for communication to/from a center server, and information about the movable body; and a separation determination part which determines whether the user is separated from the movable body or not;

transmits, when the separation determination part determines that the user is separated from the movable body, the movable body information stored in the movable body information storage part to the terminal device; and the terminal device includes:

a first movable body information reception part which receives the movable body information from the movable-body-mounted apparatus;

a second movable body information storage part which stores the movable body information received by the first movable body information reception part; and a second movable body information notification part which notifies, in response to an operation of a user, the user of the information stored in the second movable body information storage part.

Advantageous Effects of Invention

According to one embodiment of the present invention, it is possible to enhance convenience for remotely operating the movable-body-mounted apparatus mountable on the movable body such as a vehicle.

Problems, configurations, and effects which have not been described become apparent from the following description of embodiments.

DESCRIPTION OF EMBODIMENTS

Figure 1:
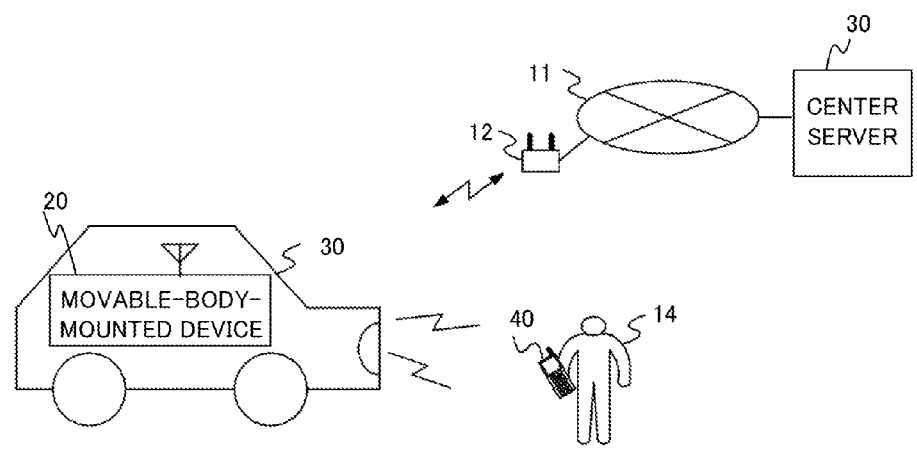
FIG. 1 is a system configuration diagram illustrating an example of a configuration of a communication system 10 according to a first embodiment.

A description is now given of a first embodiment of the present invention referring to the drawings.

FIG. 1 is a system configuration diagram illustrating an example of a configuration of a communication system 10 according to the first embodiment of the present invention. The communication system 10 includes a movable-body-mounted apparatus 20 mountable on a vehicle 13, which is an example of a movable body.

In the communication system 10 according to this embodiment, a user can transmit a command from a communication device such as a terminal device 40 which the user is carrying via a center server 30 to the movable-body-mounted apparatus 20, and receives a result of an execution result of the command via the center server 30, thereby remotely operating the movable-body-mounted apparatus 20 from a remote location. Further, in this embodiment, when the user 14 gets off the vehicle 13, the movable-body-mounted apparatus 20 notifies the user 14 of information representing a state of the vehicle 13.

A description herein is given of the vehicle 13 as an example of the movable body, but the movable body according to the present invention is not limited to the vehicle 13, and includes a movable body which travels using a plurality of legs to walk, and a movable body without wheels which travels in a levitation state without contact to the ground.

Figure 2:
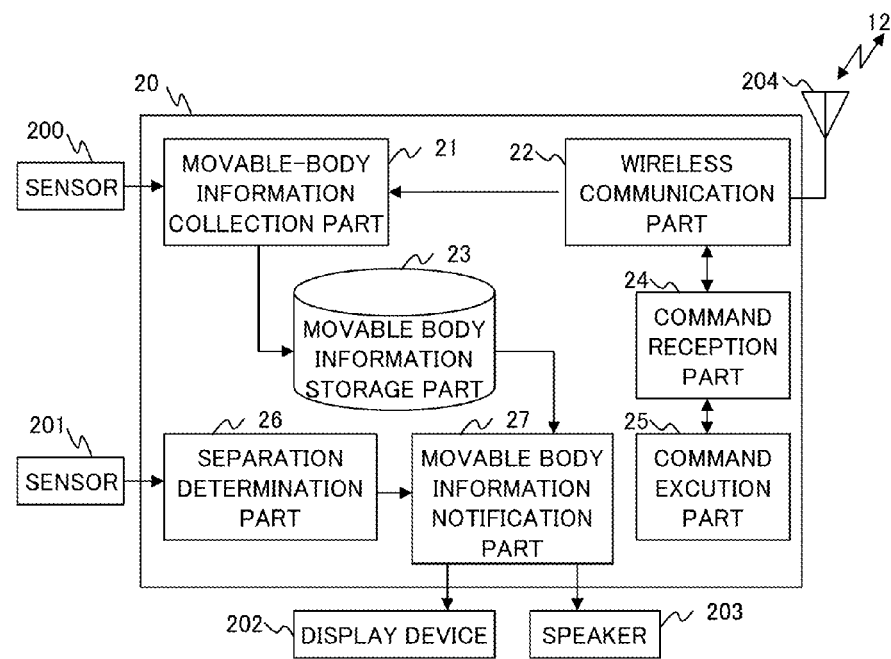
FIG. 2 is a block diagram illustrating an example of a detailed functional configuration of a movable-body-mounted apparatus 20 according to the first embodiment.

FIG. 2 is a block diagram illustrating an example of a detailed functional configuration of the movable-body-mounted apparatus 20 according to the first embodiment. The movable-body-mounted apparatus 20 according to this embodiment includes a movable body information collection part 21, a wireless communication part 22, a movable body information storage part 23, a command reception part 24, a command execution part 25, a separation determination part 26, and a movable body information notification part 27.

The wireless communication part 22 communicates to/from a nearest base station 12 by means of a wide-area wireless communication such as a cellular phone or the Worldwide Interoperability for Microwave Access (WiMAX) via an antenna 204, and communicates to/from the center server 30 via the base station 12. Moreover, the wireless communication part 22 measures a received signal quality of a radio wave transmitted from the nearest base station 12 in response to a request issued from the movable body information collection part 21, and notifies the movable body information collection part 21 of a measured result.

The movable body information collection part 21 collects information from a sensor 200 for detecting information such as a remaining amount of energy of the vehicle 13, a current position of the vehicle 13, lifetimes of consumables on the vehicle 13, and failed components. Moreover, the movable body information collection part 21 collects information on the received signal quality of the radio wave transmitted from the nearest station 12 from the wireless communication part 22.

Figures 3, 4:
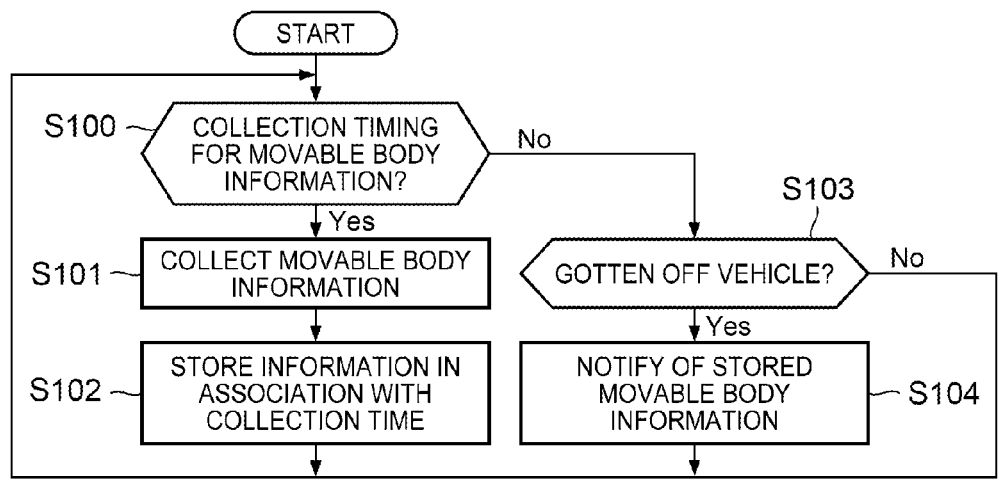
FIG. 3 is a table showing an example of a structure of data stored in a movable body information storage part 23.
FIG. 4 is a flowchart illustrating an example of an operation of the movable-body-mounted apparatus 20 according to the first embodiment.

Then, the movable body information collection part 21 stores, for example, as shown in FIG. 3, a content 231 of the movable body information corresponding to items 230 of the movable body information, and collection times 232 when the movable body information corresponding to the items was collected in association with the items in the movable body information storage part 23.

On this occasion, in this embodiment, to a content of the received signal quality stored in the movable body information storage part 23, any one of a state "strong in electric field", a state "weak in electric field", and a state "out of communication area", which are acquired by classifying the intensity of the radio wave transmitted from the nearest base station 12 for each predetermined intensity range, is registered. Moreover, the received signal quality may be classified depending not only by the intensity of the radio wave, but also by a quality of the signal such as the signal to noise ratio (SNR), the carrier to interference ratio (CIR), the Ec/Io, or the like. Moreover, a content of the remaining amount of energy stored in the movable body information storage part 23 represents a remaining amount of gasoline for a gasoline vehicle, and a remaining amount of a battery for an electric vehicle.

A command reception part 24 receives a check command and a control command via the wireless communication part 22 from the center server 30, and transmits the received command to the command execution part 25. Moreover, the command reception part 24 receives an execution result of the command from the command execution part 25, and transmits the received execution result via the wireless communication part 22 to the center server 30.

The command execution part 25 executes the command received from the command reception part 24, and returns an execution result thereof to the command reception part 24. The command executed by the command execution part 25 includes the check command for checking a state of the vehicle 13 and the control command for controlling the vehicle 13 and the movable-body-mounted apparatus 20. After the reception of the check command, the command execution part 25 reads a content of the movable body information corresponding to items specified by the command from the movable body information storage part 23, and returns the content as an execution result to the command reception part 24.

Moreover, when the command execution part 25 receives the control command, the command execution part 25 carries out processing specified by the command, and returns an execution result to the command reception part 24. The processing which can be carried out by means of the control command includes a route search on a navigation apparatus, setting of a travel route to the navigation apparatus, and a control of an air conditioner of the vehicle 13.

The separation determination part 26 determines whether the user 14, who is a driver, has gotten off the vehicle 13 or not based on a signal transmitted from a sensor 201, and if the separation determination part 25 determines that the user 14 has gotten off the vehicle 13, notifies the movable body information notification part 27 of the determination.

On this occasion, the sensor 201 includes a pressure sensor installed on a driver seat, a sensor for detecting opening of a door of the driver seat, a sensor for detecting a stop of the engine (if the vehicle 13 is an electric vehicle, a sensor for detecting a stop of a power supply of the vehicle 13), a sensor for detecting unfastening of a seat belt on the driver seat, and a sensor for detecting interruption of wired or wireless connection to electronic devices (such as the terminal device 40 carried by the user 14) registered in advance.

The method for detecting the interruption of a wired or wireless connection to an electronic device registered in advance includes a method of detecting unplugging of a communication cable, and a method of detecting a disconnection of a wireless communication link established to the electronic device by means of the Near Field Communication (NFC) or the TransferJet (trademark).

Then, if the separation determination part 26 detects that the pressure of the driver seat becomes less than a predetermined threshold, the door of the driver seat opens, the engine is stopped, the seat belt of the driver seat is unfastened, or the connection to an electronic device registered in advance is disconnected, or at least two of these conditions occur, for example, based on the signal transmitted from the sensor 201, the separation determination part 26 determines that the user 14 has gotten off the vehicle 13.

When the movable body information notification part 27 is notified of such a situation that the user 14 has gotten off the vehicle 13 from the separation determination part 26, the movable body information notification part 27 reads the movable body information from the movable body information storage part 23, and displays the read movable body information on a display device 202, or outputs the read movable body information from a speaker 203 as sound, thereby notifying the user 14 of the read movable body information.

The user 14 can freely configure the items of the movable body information notified of by the movable body information notification part 27, and a notification art. For example, if the received signal quality is "out of communication area" or the remaining amount of energy is less than 10%, the situation may be notified of by a sound via the speaker 203, and the other items may be displayed on the display device 202.

Moreover, depending on a degree of the received signal quality, the remaining amount of energy, an elapsed time from start of use of consumables, and the like, if the movable body information is notified of by means of a sound, the movable body information notification part 27 may change a tone or a melody of a check sound, a number of times the check sound is generated, or the like, or if the movable body information is notified of by means of a screen display, the movable body information notification part 27 may change a color of a background of the screen in addition to notification by means of characters.

Moreover, if the received signal quality is "out of communication area", the user cannot acquire the movable body information via the center server 30 from the movable-body-mounted apparatus 20, and hence if the received signal quality is "out of communication area", the movable body information notification part 27 notifies the user of the movable body information read from the movable body information storage part 23 by means of display or sound.

FIG. 4 is a flowchart illustrating an example of an operation of the movable-body-mounted apparatus 20 according to the first embodiment.

First, the movable body information collection part 21 determines whether a collection timing for the movable body information has been reached or not (S100). The collection timing for the movable body information may be different depending on each of the items of the movable body information, and a collection frequency of the movable body information may be increased depending on the elapsed time from the start of use for a degraded consumable.

If the collection timing for the movable body information has been reached (Yes in S100), the movable body information collection part 21 collects information from the sensor 200 and the wireless communication part 22 (S101). Then, the movable body information collection part 21 stores the collected information having items each associated with a collection time thereof in the movable body information storage part 23 (S102), and the movable body information collection part 21 again carries out the processing in Step S100.

On the other hand, if the collection timing for the movable body information has not been reached (No in S100), the separation determination part 26 determines whether the user 14 has gotten off the vehicle 13 or not based on the signal transmitted from the sensor 201 (S103). If the user 14 has not gotten off the vehicle 13 (No in S103), the movable body information collection part 21 again carries out the processing in Step S100.

If the user 14 has gotten off the vehicle 13 (Yes in S103), the separation determination part 26 notifies the movable body information notification part 27 of the situation. The movable body information notification part 27 reads the movable body information from the movable body information storage part 23, and displays the read movable body information on the display device 202, or outputs the read movable body information as a sound from the speaker 203, thereby notifying the user 14 of the read movable body information (S104), and the movable body information collection part 21 again carries out the processing in Step S100.

Figure 5:
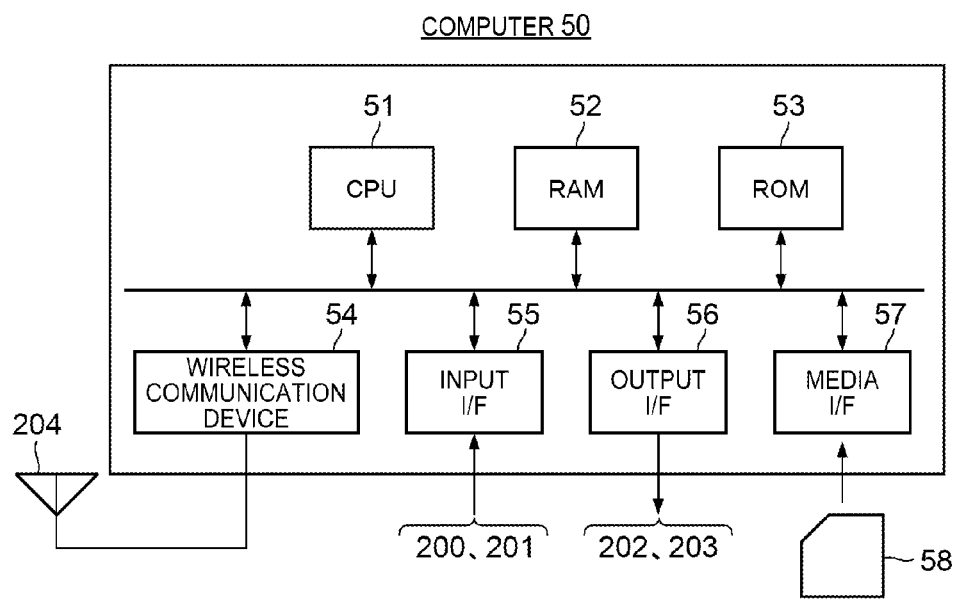
FIG. 5 is a diagram illustrating an example of a hardware configuration of a computer 50 realizing functions of the movable-body-mounted apparatus 20 according to the first embodiment.

FIG. 5 is a diagram illustrating an example of a hardware configuration of a computer 50 realizing functions of the movable-body-mounted apparatus 20 according to the first embodiment. The computer 50 includes a central processing unit (CPU) 51, a random access memory (RAM) 52, a read only memory (ROM) 53, a wireless communication device 54, an input interface (I/F) 55, an output interface (I/F) 56, and a media interface (I/F) 57.

The CPU 51 operates based on a program stored in the ROM 53, and carries out control for respective parts. The wireless communication device 54 provides the CPU 51 with data received via the antenna 204 from the base station 12, and transmits data generated by the CPU 51 via the antenna 204 to the base station 12.

The input interface 55 transmits to the CPU 51 the signals transmitted from the sensors 200 and 201. Moreover, the output interface 56 transmits data and a signal generated by the CPU 51 to the display device 202 and the speaker 203. Moreover, the output interface 56 transmits a control signal generated by the CPU 51 to the vehicle 13.

The CPU 51 reads via the media interface 57 a program stored in a medium 58, and installs the program in the ROM 53. The CPU 51 loads the program from the ROM 53 onto the RAM 52, and executes the loaded program. The medium 58 is, for example, a magnetic recording medium or a semiconductor memory.

The CPU 51 of the computer 50 executes the program loaded on the RAM 52, thereby realizing respective functions of the movable body information collection part 21, the wireless communication part 22, the command reception part 24, the command execution part 25, the separation determination part 26, and the movable body information notification part 27. Moreover, the RAM 52 stores data stored in the movable body information storage part 23.

The computer 50 reads and installs these programs from the medium 58, but, as another example, the computer 50 may acquire and install these programs via the wireless communication device 54.

The first embodiment of the present invention has been described.

As apparent from the above-mentioned description, in the communication system 10 according to this embodiment, when the user 14 gets off the vehicle 13, the user 14 is notified of the information representing the state of the vehicle 13, and, as a result, the user 14 can recognize the state of the vehicle 13 when the user 14 gets off the vehicle 13. As a result, it is possible to eliminate labor and a communication cost of the user who takes time to acquire the movable body information representing the state of the vehicle from the movable-body-mounted apparatus 20 via the center server 30.

Further, if the movable-body-mounted apparatus 20 is outside the communication area of the nearest base station 12, the user can recognize that the communication via the center server 30 with the movable-body-mounted apparatus 20 is not available when the user gets off the vehicle 13, and labor and a communication cost required for trying the remote control of the movable-body-mounted apparatus 20 in vain can be eliminated. Moreover, the user 14 can recognize that the user 14 cannot afterward check the state of the vehicle 13 or control the vehicle 13 from a remote location, and it is possible to prompt the user to acquire information on the vehicle 13 which can be required later before the user 14 leaves the vehicle 13.

Next, a description is now given of a second embodiment of the present invention referring to the drawings.

Figure 6:
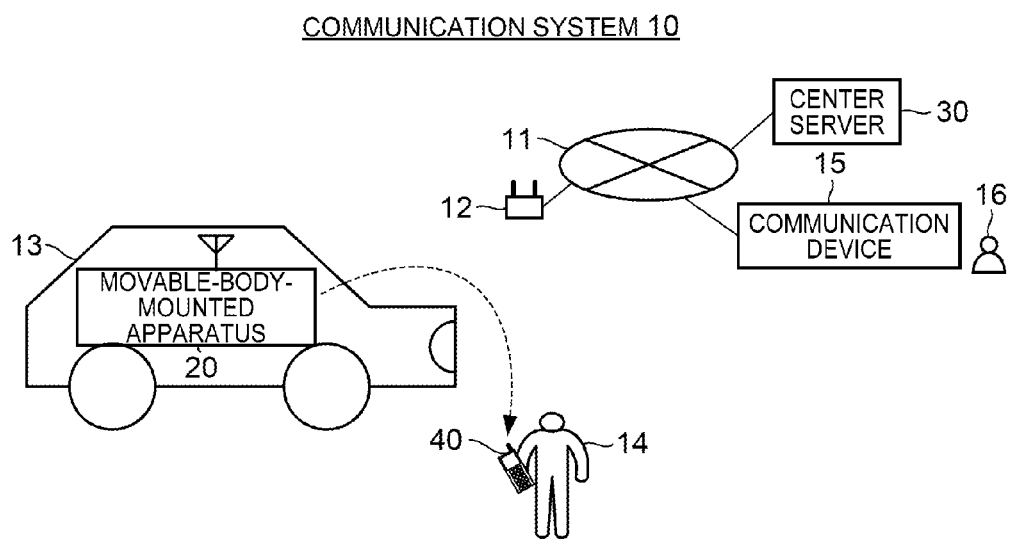
FIG. 6 is a system configuration diagram illustrating an example of a configuration of the communication system 10 according to a second embodiment.

FIG. 6 is a system configuration diagram illustrating an example of a configuration of a communication system 10 according to the second embodiment of the present invention. The communication system 10 includes a movable-body-mounted apparatus 20 mountable on a vehicle 13, which is an example of the movable body.

According to the first embodiment, the movable-body-mounted apparatus 20 can be remotely operated via the center server 30 by using a communication device 15 other than the terminal device 40, but this embodiment particularly relates to a remote operation of the movable-body-mounted apparatus 20 in such a case that the movable-body-mounted apparatus 20 is outside the communication area of the base station 12.

Figure 7:
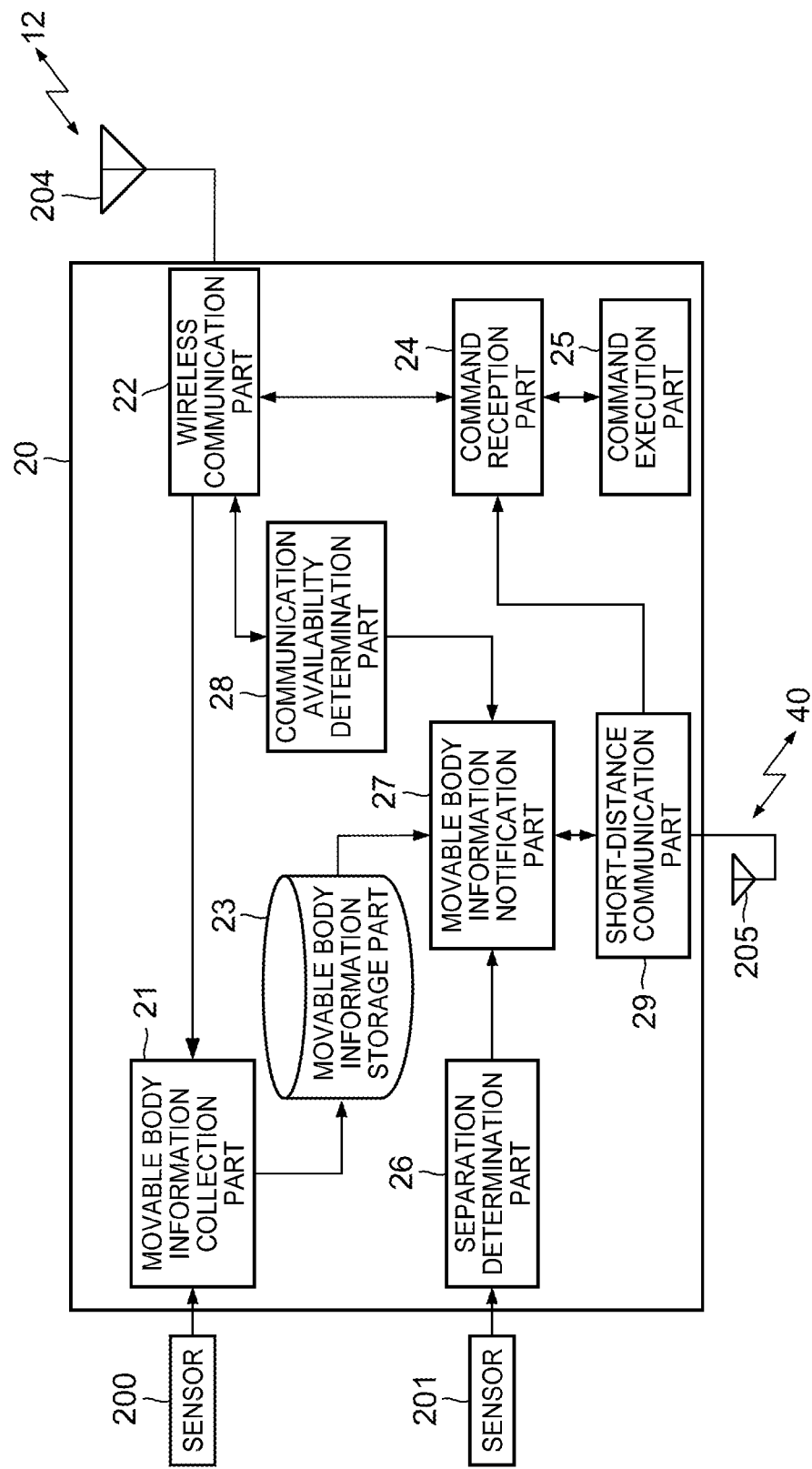
FIG. 7 is a block diagram illustrating an example of a detailed functional configuration of the movable-body-mounted apparatus 20 according to the second embodiment.

FIG. 7 is a block diagram illustrating an example of a detailed functional configuration of the movable-body-mounted apparatus 20 according to the second embodiment. The movable-body-mounted apparatus 20 according to this embodiment includes the movable body information collection part 21, the wireless communication part 22, the movable body information storage part 23, the command reception part 24, the command execution part 25, the separation determination part 26, the movable body information notification part 27, a communication availability determination part 28, and a short-distance communication part 29. In FIG. 7, except for points described below, configurations denoted by the same reference numerals as those of FIG. 2 have functions the same as or similar to the functions of the configuration in FIG. 2, and a description thereof is therefore omitted.

The wireless communication part 22 measures the received signal quality of the radio wave transmitted from the nearest base station 12 in response to a request issued from the communication availability determination part 28, and notifies the communication availability determination part 28 of a measurement result. The communication availability determination part 28 acquires the measurement result of the received signal quality from the wireless communication part 22 at every predetermined timing. Then, if the received signal quality changes to a quality corresponding to the state "out of communication area", the communication availability determination part 28 holds the change to the state "out of communication area" associated with a time of the change as history information, and notifies the movable body information notification part 27 of the change to the state out of communication area.

Moreover, if the received signal quality changes to a quality corresponding to the state "weak in electric field", the communication availability determination part 28 holds the change to the state "weak in electric field" associated with a time of the change as history information, and notifies the movable body information notification part 27 of the change to the state "weak in electric field". Then, if the received signal quality corresponds to the weak electric field, the communication availability determination part 28 transmits a weak electric field notification including the state "weak in electric field" and a movable body ID for identifying the movable-body-mounted apparatus 20 via the wireless communication part 22 to the center server 30 at every predetermined timing (such as every 10 seconds).

Moreover, if the received signal quality changes to a quality corresponding to the state "strong in electric field", the communication availability determination part 28 holds the change to the state "strong in electric field" associated with a time of the change as history information, and notifies the movable body information notification part 27 of the change to the state "strong in electric field". Then, the communication availability determination part 28 transmits a strong electric field notification including the held history information, information on the change in state to strong electric field, and the movable body ID via the wireless communication part 22 to the center server 30.

The short-distance communication part 29 communicates to/from the terminal device 40 of the user 14 by means of a short-distance wireless communication method such as the Bluetooth (trademark), the Ultra Wide Band (UAB), the Wi-Fi (trademark), the NFC, the TransferJet, or the like via the antenna 205. When the command reception part 24 receives a control command via the short-distance communication part 29 from the terminal device 40, the command reception part 24 transmits the received control command to the command execution part 25.

When the movable body information notification part 27 is notified by the separation determination part 26 of such a situation that the user 14 has gotten off the vehicle 13, if the movable body information notification part 27 has been notified by the communication availability determination part 28 of the change to the state "out of communication area", the movable body information notification part 27 reads the movable body information from the movable body information storage part 23, and transmits the read movable body information along with a movable body ID of the own apparatus via the short-distance communication part 29 to the terminal device 40.

In this way, if the movable-body-mounted apparatus 20 is out of the communication area of the base station 12, the movable body information is transmitted to the terminal device 40, and even if the user 14 of the terminal device 40 cannot transmit the check command via the center server 30 to the movable-body-mounted apparatus 20, the user 14 can refer to the movable body information in the terminal device 40, thereby checking the state of the vehicle 13.

According to this embodiment, the movable body information notification part 27 transmits the movable body information to the terminal device 40 of the user 14, but the movable body information may be displayed on the display device of the movable-body-mounted apparatus 20, or may be output as a sound from the speaker of the movable-body-mounted apparatus 20, thereby notifying the user 14 of the movable body information. Moreover, if the mobile-body-information notification part 27 detects an unavailable state of the short-distance wireless communication to/from the terminal device 40 because of radio disturbance or the like, the movable body information notification part 27 may switch the notification method for the movable body information to the display or the sound.

Figure 8:
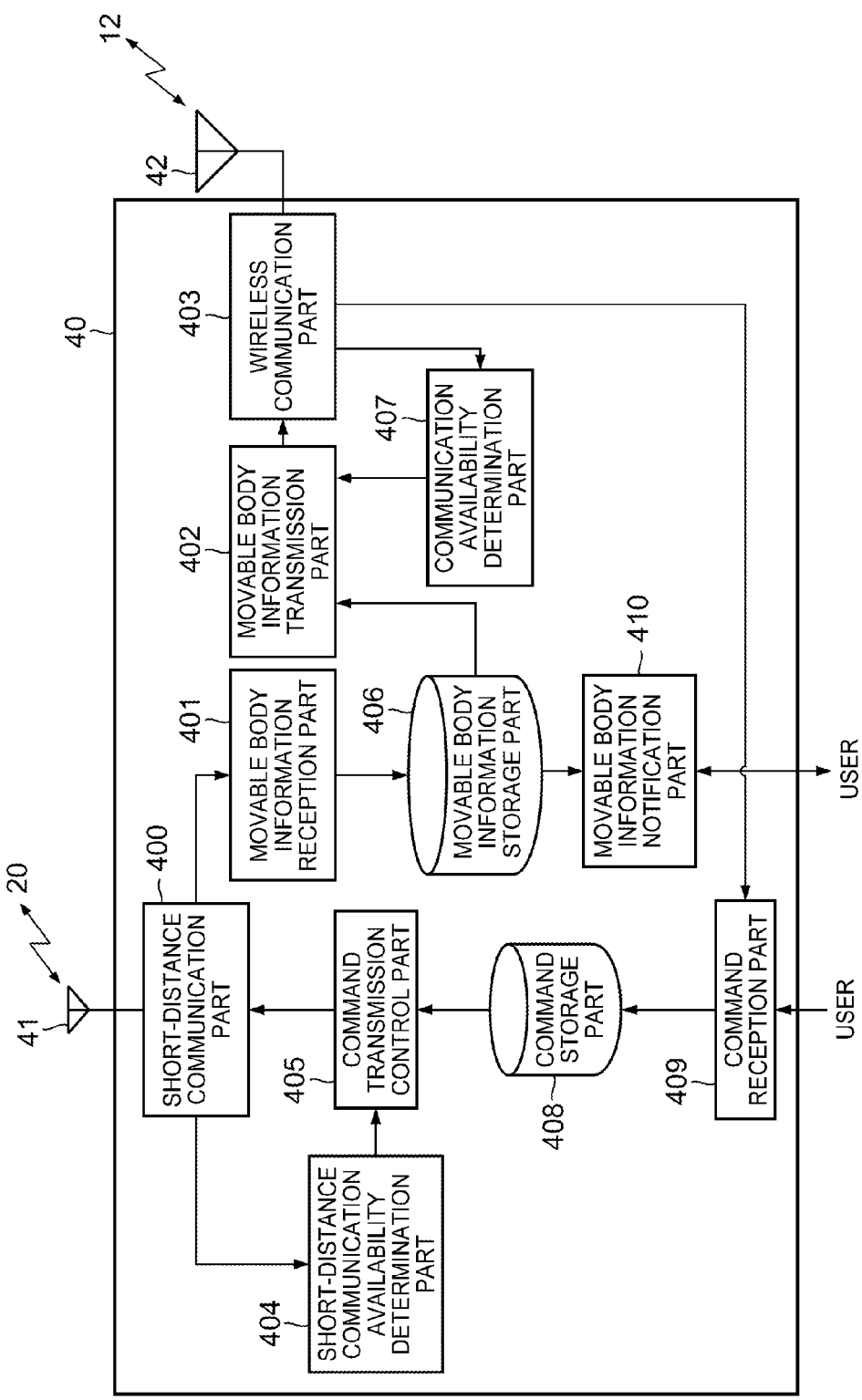
FIG. 8 is a block diagram illustrating an example of a detailed functional configuration of a terminal device 40 according to the second embodiment.

FIG. 8 is a block diagram illustrating an example of a detailed functional configuration of the terminal device 40 according to the second embodiment. The terminal device 40 includes a short-distance communication part 400, a movable body information reception part 401, a movable body information transmission part 402, a wireless communication part 403, a short-distance communication availability determination part 404, a command transmission control part 405, a movable body information storage part 406, a communication availability determination part 407, a command storage part 408, a command reception part 409, and a movable body information notification part 410.

The short-distance communication part 400 communicates to/from the movable-body-mounted apparatus 20 by means of the short-distance wireless communication method such as the Bluetooth, the UWB, the Wi-Fi, the NFC, and the TransferJet. The movable body information reception part 401 receives, via the short-distance communication part 400 from the movable-body-mounted apparatus 20, the movable body information along with the movable body ID, and stores the received movable body information along with the movable body ID in the movable body information storage part 406.

When the movable body information notification part 410 receives a check command via the input device installed on the terminal device 40 from the user 14, the movable body information notification part 410 reads movable body information on items corresponding to the check command from the movable body information storage part 406, and notifies the user 14 via the screen or the speaker installed on the terminal device 40 of the read movable body information.

The wireless communication part 403 communicates to/from the nearest base station 12 via the antenna 42 by means of a wide-area wireless communication such as a cellular phone or the WiMAX, and communicates to/from the center server 30 via the base station 12. Moreover, the wireless communication part 403 measures the received signal quality of the radio wave transmitted from the nearest base station 12 in response to a request issued from the communication availability determination part 407, and notifies the communication availability determination part 407 of a measured result.

The communication availability determination part 407 acquires the measured result of the received signal quality from the wireless communication part 403. Then, if the received signal quality changes to a quality corresponding to the state "out of communication area", the communication availability determination part 407 notifies the movable body information transmission part 402 of the change to the state "out of communication area". Moreover, if the received signal quality changes from the state "out of communication area" to a quality corresponding to the weak electric field or the strong electric field, the communication availability determination part 407 notifies the movable body information transmission part 402 of the available state of communication to/from the nearest base station. 12

When movable body information is stored in the movable body information storage part 406, if the movable body information transmission part 402 has been notified of the available state of the communication to/from the nearest base station 12 from the communication availability determination part 407, the movable body information transmission part 402 reads a movable body ID and the movable body information from the movable body information storage part 406, and transmits the read movable body ID and the movable body information via the wireless communication part 403 to the center server 30.

On the other hand, when movable body information is stored in the movable body information storage part 406, if the movable body information transmission part 402 has not been notified of the available state of the communication to/from the nearest base station 12 from the communication availability determination part 407, the movable body information transmission part 402 postpones the transmission of the movable body ID and the movable body information to the center server 30 until the available state of the communication to/from the nearest base station 12 is notified of from the communication availability determination part 407.

Then, when notified of the available state of the communication to/from the nearest base station 12 from the communication availability determination part 407, the movable body information transmission part 402 reads the movable body ID and the movable body information from the movable body information storage part 406, and transmits the read movable body ID and movable body information via the wireless communication part 403 to the center server 30.

When the command reception part 409 receives a control command via the input device installed on the terminal device 40 from the user 14, the command reception part 409 stores the received control command in the command storage part 408. Moreover, when the command reception part 409 receives a control command via the wireless communication part 403 from the center server 30, the command reception part 409 stores also the received control command in the command storage part 408.

The short-distance communication availability determination part 404 tries short-distance wireless communication via the short-distance communication part 400 to/from the movable-body-mounted apparatus 20 at each predetermined timing, and, when the short-distance wireless communication to/from the movable-body-mounted apparatus 20 becomes available, notifies the command transmission control part 405 of the available state.

When a control command is stored in the command storage part 408, if the command transmission control part 405 has been notified of the available state of the short-distance wireless communication to/from the movable-body-mounted apparatus 20 from the short-distance communication availability determination part 404, the command transmission control part 405 reads the control command from the command storage part 408, and transmits the read control command via the short-distance communication part 400 to the movable-body-mounted apparatus 20.

On the other hand, when a control command is stored in the command storage part 408, if the command transmission control part 405 has not been notified of the available state of the short-distance wireless communication to/from the movable-body-mounted apparatus 20 from the short-distance communication availability determination part 404, the command transmission control part 405 postpones the transmission of the control command to the movable-body-mounted apparatus 20 until the available state of the short-distance wireless communication to/from the movable-body-mounted apparatus 20 is notified of from the short-distance communication availability determination part 404.

Then, when the command transmission control part 405 is notified of the available state of the short-distance wireless communication to/from the movable-body-mounted apparatus 20 from the short-distance communication availability determination part 404, the command transmission control part 405 reads information on an input source and the control command from the command storage part 408, and transmits the read information on the input source and control command via the short-distance communication part 400 to the movable-body-mounted apparatus 20.

Figure 9:
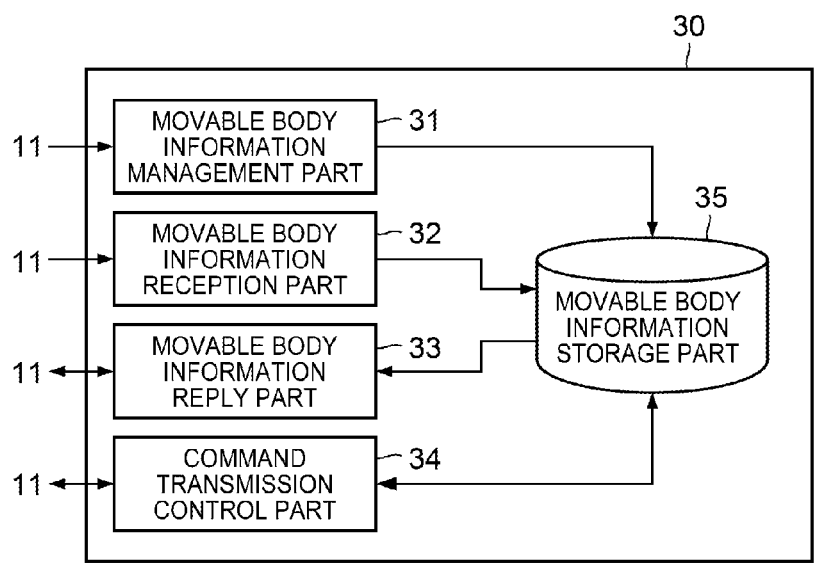
FIG. 9 is a block diagram illustrating an example of a detailed functional configuration of a center server 30 according to the second embodiment.

FIG. 9 is a block diagram illustrating an example of a detailed functional configuration of the center server 30 according to the second embodiment. The center server 30 includes a movable body information management part 31, a movable body information reception part 32, a movable body information reply part 33, a command transmission control part 34, and a movable body information storage part 35.

Figure 10:
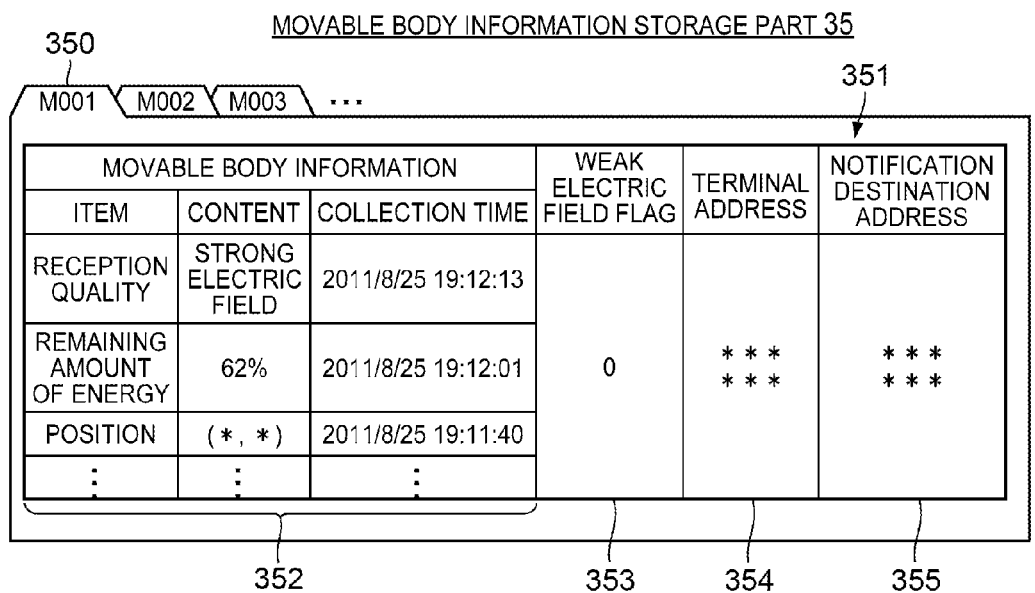
FIG. 10 is a table showing an example of a structure of data stored in a movable body information storage part 35.

In the movable body information storage part 35, for example, as shown in FIG. 10, a movable body information table 351 is stored for each movable body ID 350 for identifying each movable-body-mounted apparatus 20. In each movable body information table 351, movable body information 352, a weak electric field flag 353, a terminal address 354, and a notification destination address 355 are stored.

When the movable body information management part 31 receives a strong electric field notification via a communication line 11 from the movable-body-mounted apparatus 20, the movable body information management part 31 identifies a movable body information table 351 corresponding to a movable body ID included in the strong electric field notification in the movable body information storage part 35. Then, if movable body information 352 is stored in the identified movable body information table 351, the movable body information management part 31 deletes the movable body information 352 from the movable body information table 351, and resets the weak electric field flag 353 to 0.

Then, if the notification destination address 355 is registered to the identified movable body information table 351, the movable body information management part 31 transmits the entrance of the movable-body-mounted apparatus 20 into the strong electric field area, and the history information contained in the received strong electric field notification to the notification destination address 355.

Moreover, when the movable body information management part 31 receives a weak electric field notification via the communication line 11 from the movable-body-mounted apparatus 20, the movable body information management part 31 identifies a movable body information table 351 corresponding to a movable body ID included in the weak electric field notification in the movable body information storage part 35. Then, if the movable body information 352 is stored in the identified movable body information table 351, the movable body information management part 31 deletes the movable body information 352 from the movable body information table 351, and sets the weak electric field flag 353 to 1.

When the movable body information reception part 32 receives movable body information along with a movable body ID via the communication line 11 from the terminal device 40, the movable body information reception part 32 identifies a movable body information table 351 corresponding to the movable body ID in the movable body information storage part 35. Then, the movable body information reception part 32 registers the received movable body information to the identified movable body information table 351, and registers an address of the terminal device 40 as the transmission source of the movable body information to the terminal address 354 of the identified movable body information table 351.

The registration of the movable body information 352 to the movable body information table 351 means that the terminal device 40 which has received the movable body information by means of the short-distance communication from the movable-body-mounted apparatus transmits the movable body information in place of the movable-body-mounted apparatus 20, and the corresponding movable-body-mounted apparatus 20 is out of the communication area.

When the movable body information reply part 33 receives a check command along with a movable body ID via the communication line 11 from a communication device 15 of another user 16, the movable body information reply part 33 identifies a movable body information table 351 corresponding to the movable body ID in the movable body information storage part 35. Then, if movable body information 352 is registered to the identified movable body information table 351, the movable body information reply part 33 extracts information on items corresponding to the check command from the movable body information 352, and replies with the extracted information.

On the other hand, if movable body information 352 is not registered to the identified movable body information table 351, the movable body information reply part 33 transmits the received check command to the movable-body-mounted apparatus 20 corresponding to the received movable body ID via the communication line 11. Then, the movable body information reply part 33 transmits a response from the movable-body-mounted apparatus 20 to the communication device 15, which is the transmission source of the check command.

If there is no response from the movable-body-mounted apparatus 20, the movable body information reply part 33 notifies the communication device 15, which is the transmission source of the check command, of an error, and if 1 is set to the weak electric field flag 353 in the movable body information table 351 corresponding to a movable body ID of the movable-body-mounted apparatus 20, the movable body information reply part 33 may additionally notify the communication device 15 of such possibility that the movable-body-mounted apparatus 20 is out of communication area.

When the command transmission control part 34 receives a control command along with a movable body ID via the communication line 11 from the communication device 15 of another user 16, the command transmission control part 34 identifies a movable body information table 351 corresponding to the movable body ID in the movable body information storage part 35. Then, if movable body information 352 is not registered to the identified movable body information table 351, the command transmission control part 34 transmits the received control command to a movable-body-mounted apparatus 20 corresponding to the received movable body ID via the communication line 11. Then, the command transmission control part 34 transmits a response from the movable-body-mounted apparatus 20 to the communication device 15, which is the transmission source of the check command.

On the other hand, if movable body information 352 is registered to the identified movable body information table 351, the command transmission control part 34 notifies the communication device 15, which is the transmission source of the control command, of such a state that the movable-body-mounted apparatus 20 subject to control is out of communication area, and such a state that the control command can be transmitted also via a terminal device 40. If the command transmission control part 34 is instructed to transmit the control command via the terminal device 40, the command transmission control part 34 transmits the control command to the terminal device 40 corresponding to the terminal address 354. Then, if there is such a response that the control command has been normally received from the terminal device 40, the command transmission control part 34 notifies the communication device 15, which is the transmission source of the control command, of the normal reception.

Moreover, if the command transmission control part 34 receives a command requesting a notification to be transmitted when the movable-body-mounted apparatus 20 enters an area of the strong electric field along with a movable body ID and a notification destination address via the communication line 11 from a communication device 15 of another user 16, the command transmission control part 34 identifies a movable body information table 351 corresponding to the movable body ID in the movable body information storage part 35. Then, the command transmission control part 34 registers the notification destination address received from the communication device 15 to the notification destination address 355 in the identified movable body information table 351.

Figure 11:
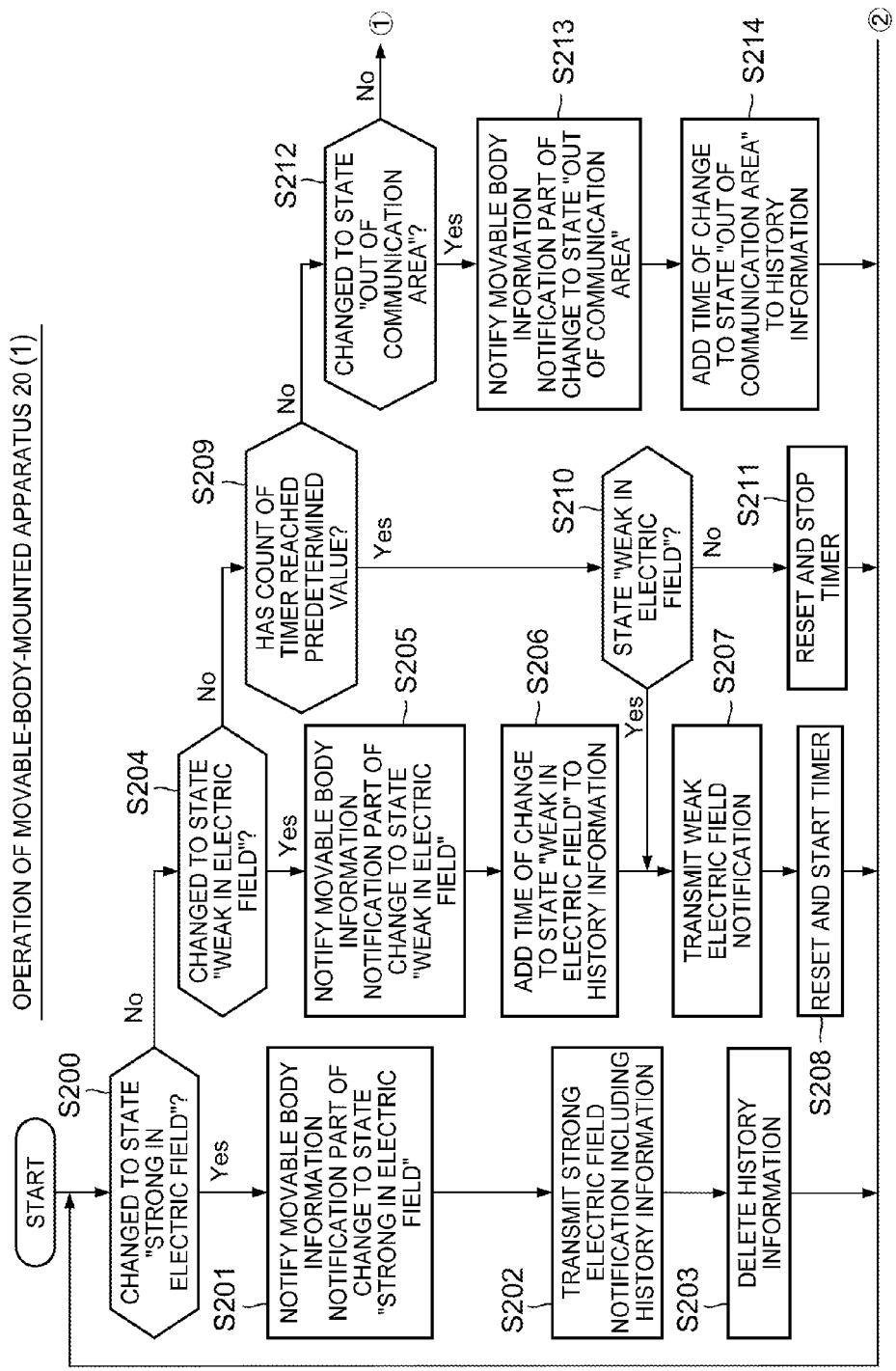
FIG. 11 is a flowchart illustrating an example of an operation of the movable-body-mounted apparatus 20 according to the second embodiment.
Figure 12:
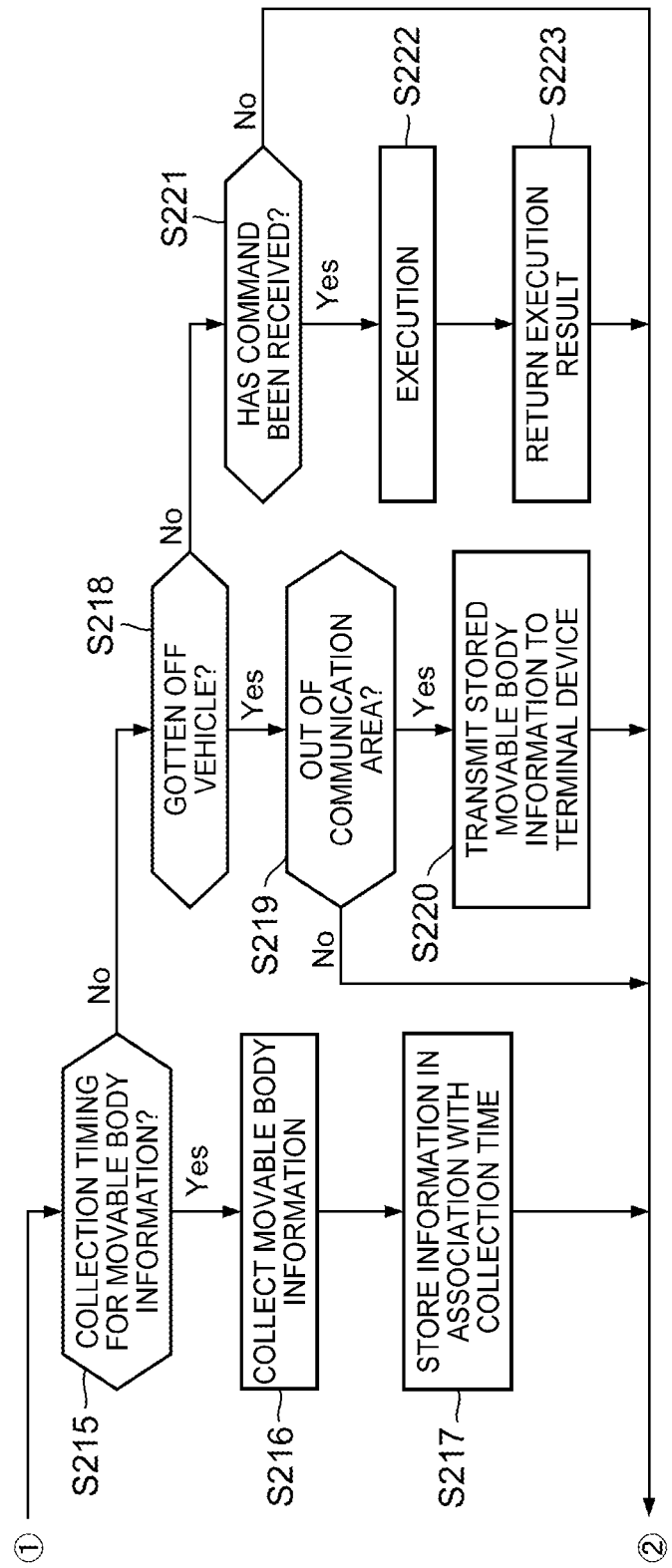
FIG. 12 is a flowchart illustrating the example of the operation of the movable-body-mounted apparatus 20 according to the second embodiment.

FIGS. 11 and 12 are flowcharts illustrating an example of an operation of the movable-body-mounted apparatus 20 according to the second embodiment.

First, the communication availability determination part 28 determines whether the received signal quality has changed to a quality corresponding to the strong electric field or not (S200). If the received signal quality has changed to a quality corresponding to the strong electric field (Yes in S200), the communication availability determination part 28 notifies the movable body information notification part 27 of the change to the strong electric field (S201).

Then, the communication availability determination part 28 holds the change to the strong electric field associated with a time of the change as history information, and transmits a strong electric field notification including the held history information, information on the change to the strong electric field, and a movable body ID via the wireless communication part 22 to the center server 30 (S202). Then, the communication availability determination part 28 deletes the history information (S203), and again carries out the processing in Step S200.

If the received signal quality has not changed to a quality corresponding to the strong electric field (No in S200), the communication availability determination part 28 determines whether the received signal quality has changed to a quality corresponding to the weak electric field or not (S204). If the received signal quality has changed to a quality corresponding to the weak electric field (Yes in S204), the communication availability determination part 28 notifies the movable body information notification part 27 of the change to the weak electric field (S205).

Then, the communication availability determination part 28 holds the change to the weak electric field associated with a time of change as history information (S206), and transmits a weak electric field notification including the change to the weak electric field, and the movable body ID for identifying the movable-body-mounted apparatus 20 via the wireless communication part 22 to the center server 30 (S207). Then, the communication availability determination part 28 resets and starts a timer for counting a transmission interval of the weak electric field notification (S208), and again carries out the processing in Step S200.

If the received signal quality has not changed to a quality corresponding to the weak electric field (No in S204), the communication availability determination part 28 determines whether a count of the timer has reached a predetermined value (such as a value corresponding to ten seconds) or not (S209). If the count of the timer has reached the predetermined value (Yes in S209), the communication availability determination part 28 determines whether the received signal quality measured by the wireless communication part 22 represents a quality corresponding to the weak electric field or not (S210).

If the received signal quality represents a quality corresponding to the weak electric field (Yes in S210), the communication availability determination part 28 carries out the processing in Step S207. On the other hand, if the received signal quality does not represent a quality corresponding to the weak electric field (No in S210), the communication availability determination part 28 resets the count of the timer to 0, thereby stopping the timer (S211), and again carries out the processing in Step S200.

If the count of the timer has not reached the predetermined value (No in S209), the communication availability determination part 28 determines whether the received signal quality has changed to a quality corresponding to the state "out of communication area" or not (S212). If the received signal quality has changed to a quality corresponding to the state "out of communication area" (Yes in S212), the communication availability determination part 28 notifies the movable body information notification part 27 of the change to the state "out of communication area" (S213). Then, the communication availability determination part 28 holds the change to the state "out of communication area" associated with a time of change as the history information (S214), and again carries out the processing in Step S200.

If the received signal quality has not changed to a quality corresponding to the state "out of communication area" (No in S212), the movable body information collection part 21 determines whether the collection timing for the movable body information has been reached or not (S215 in FIG. 12). If the collection timing for the movable body information has been reached (Yes in S215), the movable body information collection part 21 collects information from the sensor 200 and the wireless communication part 22 (S216). Then, the movable body information collection part 21 stores the collected information, each item of which is associated with a collection time thereof, in the movable body information storage part 23 (S217), and the communication availability determination part 28 again carries out the processing in Step S200.

If the collection timing for the movable body information has not been reached (No in S215), the separation determination part 26 determines whether the user 14 has gotten off the vehicle 13 or not based on the signal transmitted from the sensor 201 (S218). If the user 14 has gotten of the vehicle 13 (Yes in S218), the separation determination part 26 notifies the movable body information notification part 27 of the situation.

The movable body information notification part 27 determines whether a change to the state "out of communication area" has been notified of from the communication availability determination part 28 or not (S219). If the state "out of communication area" has not been notified of (No in S219), the communication availability determination part 28 again carries out the processing in Step S200.

On the other hand, if the state "out of communication area" has been notified of (Yes in S219), the movable body information notification part 27 reads the movable body information from the movable body information storage part 23. Then, the movable body information notification part 27 transmits the read movable body information along with the movable body ID via the short-distance communication part 29 to the terminal device 40 (S220), and the communication availability determination part 28 again carries out the processing in Step S200.

If the user 14 has not gotten off the vehicle 13 (No in S218), the command reception part 24 determines whether a check command or a control command has been received via the wireless communication part 22 or the short-distance communication part 29 or not (S221). If a check command or a control command has been received (Yes in S221), the command reception part 24 transmits the received command to the command execution part 25.

The command execution part 25 executes the command received from the command reception part 24 (S222), and returns an execution result thereof to the command reception part 24 (S223). If the command received via the wireless communication part 22 is executed, the command reception part 24 returns an execution result via the wireless communication part 22 to the center server 30, and the communication availability determination part 28 again carries out the processing in Step S200. If neither a check command nor a control command has been received (No in S221), the communication availability determination part 28 again carries out the processing in Step S200.

Figure 13:
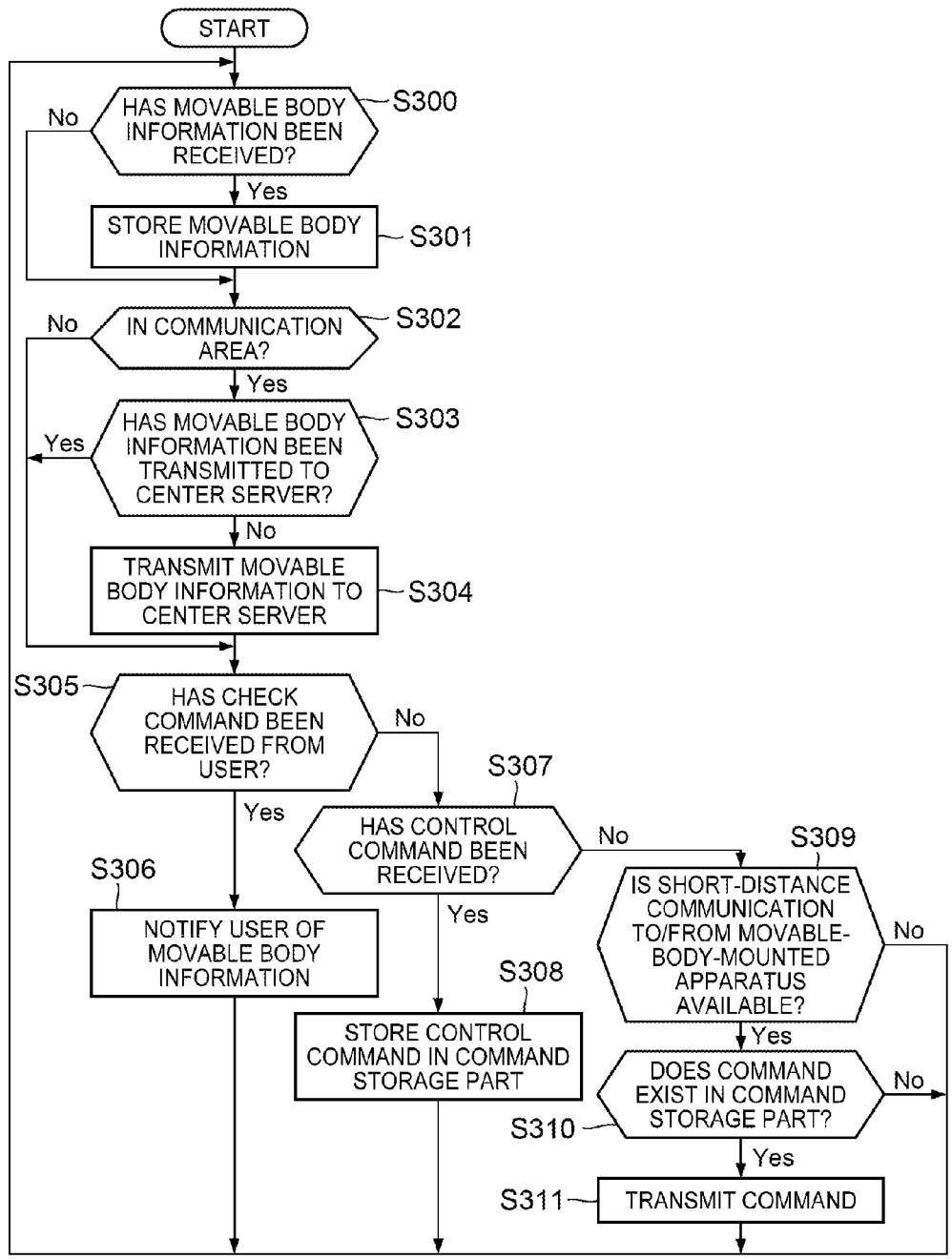
FIG. 13 is a flowchart illustrating an example of an operation of the terminal device 40 according to the second embodiment.

FIG. 13 is a flowchart illustrating an example of an operation of the terminal device 40 according to the second embodiment.

First, the movable body information reception part 401 determines whether movable body information is received via the short-distance communication part 400 by means of the short-distance wireless communication from the movable-body-mounted apparatus 20 or not (S300). If movable body information has not been received from the movable-body-mounted apparatus 20 (No in S300), the movable body information transmission part 402 carries out processing in Step S302. On the other hand, if movable body information has been received from the movable-body-mounted apparatus 20 (Yes in S300), the movable body information reception part 401 stores the received movable body information along with a movable body ID received along with the movable body information in the movable body information storage part 406 (S301).

Then, the movable body information transmission part 402 determines whether the availability of the communication to/from the nearest base station 12, namely being in the communication area has been notified from the communication availability determination part 407 or not (S302). If not being in the communication area (No in S302), the movable body information notification part 410 carries out processing in Step S305.

If being in the communication area (Yes in S302), movable body information is stored in the movable body information storage part 406, and if the movable body information has not been transmitted to the center server 30 (No in S303), the movable body information transmission part 402 reads a movable body ID and the movable body information from the movable body information storage part 406, and transmits the read movable body ID and movable body information via the wireless communication part 403 to the center server 30 (S304).

Then, the movable body information notification part 410 determines whether a check command has been received via the input device installed on the terminal device 40 from the user 14 or not (S305). If a check command has been received from the user 14 (Yes in S305), the movable body information notification part 410 reads movable body information on items corresponding to the check command from the movable body information storage part 406. Then, the movable body information notification part 410 notifies the user 14 of the read movable body information via the screen or the speaker installed on the terminal device 40 (S306), and the movable body information reception part 401 again carries out the processing in Step S300.

If a check command has not been received from the user 14 (No in S305), the command reception part 409 determines whether a control command has been received from the input device installed on the terminal device 40 or the wireless communication part 403 or not (S307). If a control command has been received (Yes in S307), the command reception part 409 stores the received control command in the storage part 408 (S308), and notifies the user of the reception of the control command via the display device or the like installed on the terminal device 40, and the movable body information reception part 401 again carries out the processing in Step S300.

If a control command has not been received (No in S307), the command transmission control part 405 determines whether the available state of the short-distance wireless communication to/from the movable-body-mounted apparatus 20 has been notified of by the short-distance communication availability determination part 404 or not (S309). If the short-distance wireless communication to/from the movable-body-mounted apparatus 20 is available (Yes in S309), the command transmission control part 405 determines whether a command is stored in the command storage part 408 or not (S310).

If the short-distance wireless communication to/from the movable-body-mounted apparatus 20 is not available (No in S309) or a command is not stored in the command storage part 408 (No in S310), the movable body information reception part 401 again carries out the processing in Step S300.

If a command is stored in the command storage part 408 (Yes in S310), the command transmission control part 405 reads the control command from the command storage part 408. Then, the command transmission control part 405 transmits the read control command via the short-distance communication part 400 to the movable-body-mounted apparatus 20 (S311), and the movable body information reception part 401 again carries out the processing in Step S300.

Figure 14:
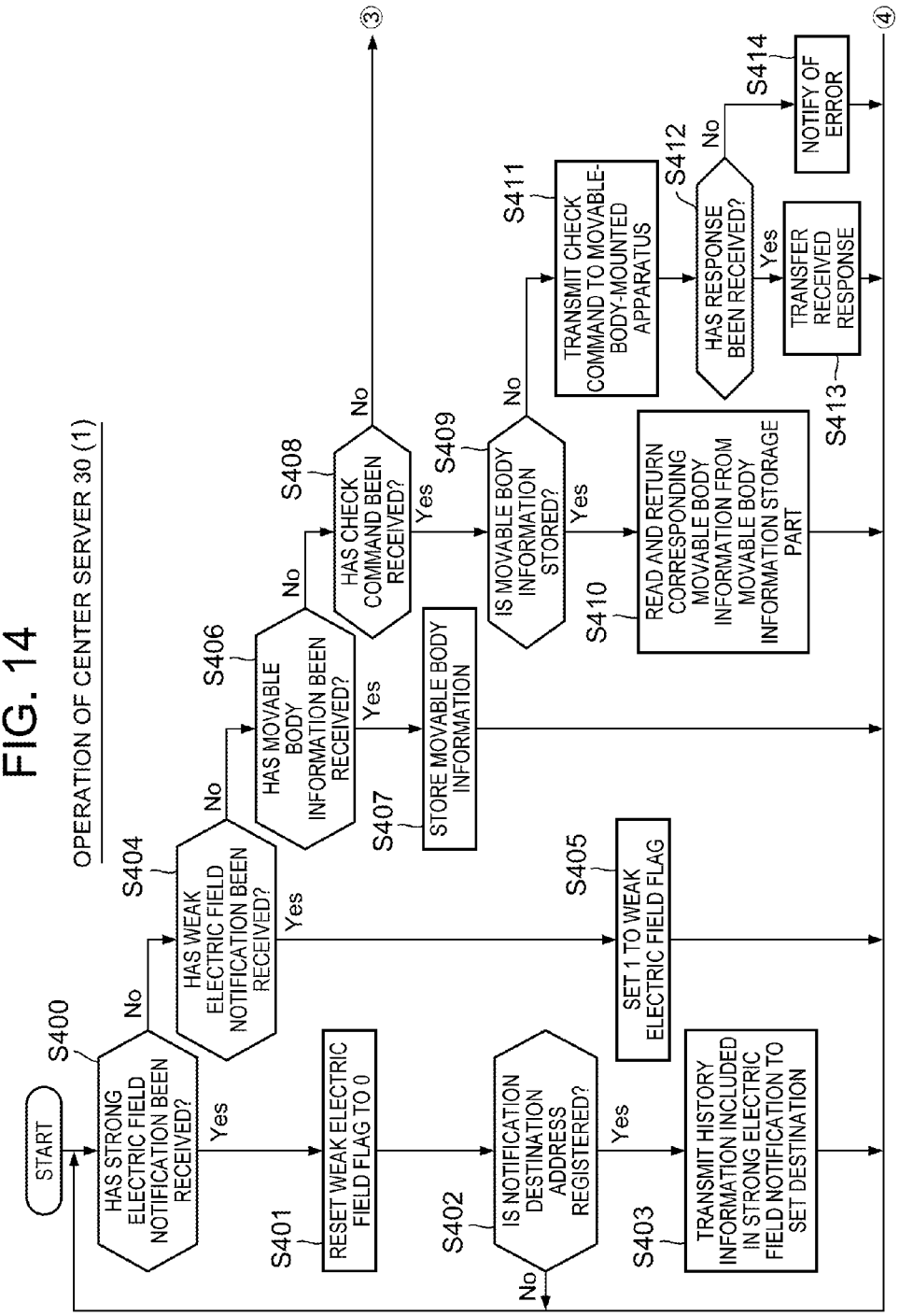
FIG. 14 is a flowchart illustrating an example of an operation of the center server 30 according to the second embodiment.
Figure 15:
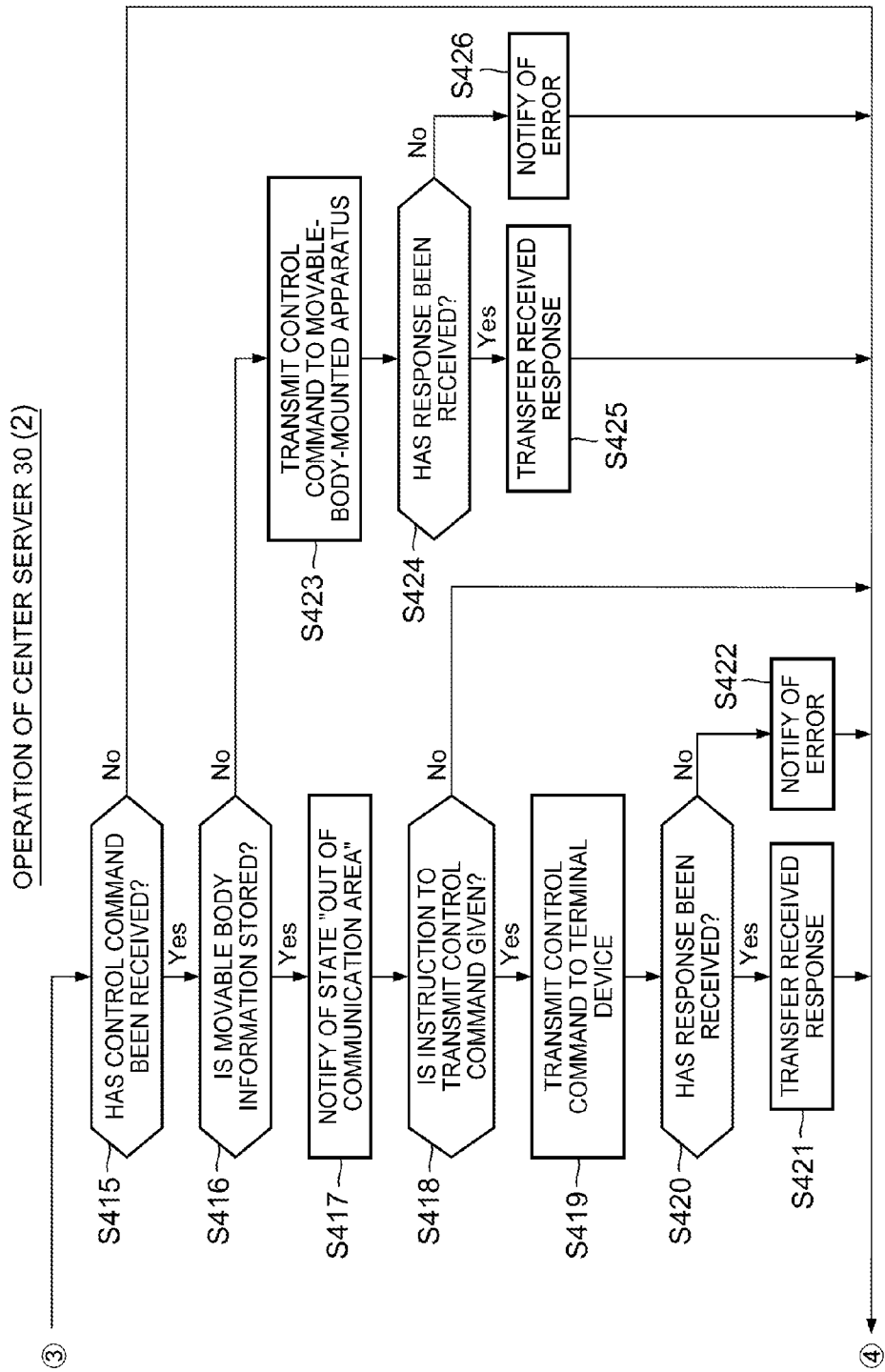
FIG. 15 is a flowchart illustrating the example of the operation of the center server 30 according to the second embodiment.

FIGS. 14 and 15 are flowcharts illustrating an example of an operation of the center server 30 according to the second embodiment.

First, the movable body information reception part 31 determines whether a strong electric field notification has been received via the communication line 11 from the movable-body-mounted apparatus 20 or not (S400). If the movable body information reception part 31 has received a strong electric field notification (Yes in S400), the movable body information management part 31 identifies a movable body information table 351 corresponding to a movable body ID included in the strong electric field notification in the movable body information storage part 35.

Then, if movable body information 352 is stored in the identified movable body information table 351, the movable body information management part 31 deletes the movable body information 352 from the movable body information table 351, and resets the weak electric field flag 353 to 0 (S401).

Then, if a notification destination address 355 is registered to the movable body information table 351 (Yes in S402), the movable body information management part 31 transmits history information included in the received strong electric field notification along with such a situation that the movable-body-mounted apparatus 20 has entered the area of strong electric field to a notification destination address 355 registered to the identified movable body information table 351 (S403), and again carries out the processing in Step S400.

If a strong electric field notification has not been received (No in S400), the movable body information management part 31 determines whether a weak electric field notification has been received via the communication line 11 from a movable-body-mounted apparatus 20 or not (S404). If the movable body information management part 31 has received a weak electric field notification (Yes in S404), the movable body information management part 31 identifies a movable body information table 351 corresponding to a movable body ID included in the weak electric field notification in the movable body information storage part 35.

Then, if movable body information 352 is stored in the identified movable body information table 351, the movable body information management part 31 deletes the movable body information 352 from the movable body information table 351. Then, the movable body information management part 31 sets 1 to the weak electric field flag 353 in the identified movable body information table 351 (S405), and again carries out the processing in Step S400.

If a weak electric field notification has not been received (No in S404), the movable body information reception part 32 determines whether movable body information along with a movable body ID has been received via the communication line 11 from a terminal device 40 or not (S406). If the movable body information reception part 32 has received movable body information (Yes in S406), the movable body information reception part 32 identifies a movable body information table 351 corresponding to the received movable body ID in the movable body information storage part 35.

Then, the movable body information reception part 32 registers the received movable body information to the identified movable body information table 351 (S407). Then, the movable body information reception part 32 registers an address of the terminal device 40 as the transmission source of the movable body information to the terminal address 354 of the identified movable body information table 351, and the movable body information management part 31 again carries out the processing in Step S400.

If movable body information has not been received (No in S406), the movable body information reply part 33 determines whether a check command along with a movable body ID has been received via the communication line 11 from a communication device 15 of another user 16 or not (S408). If a check command has been received (Yes in S408), the movable body information reply part 33 identifies a movable body information table 351 corresponding to the movable body ID received along with the check command in the movable body information storage part 35.

Then, the movable body information reply part 33 determines whether movable body information 352 is registered to the identified movable body information table 351 or not (S409). If movable body information 352 is registered (Yes in S409), the movable body information reply part 33 extracts information on items corresponding to the check command from the movable body information 352, and replies with the information (S410), and the movable body information management part 31 again carries out the processing in Step S400.

On the other hand, if movable body information 352 is not registered (No in S409), the movable body information reply part 33 transmits the check command to a movable-body-mounted apparatus 20 corresponding to the movable body ID via the communication line 11 (S411). If a response is received from the movable-body-mounted apparatus 20 (Yes in S412), the movable body information reply part 33 transmits the received response to the communication device 15, which is the transmission source of the check command (S413), and the movable body information management part 31 again carries out the processing in Step S400.

On the other hand, if there is no response from the movable-body-mounted apparatus 20 (No in S412), the movable body information reply part 33 notifies the communication device 15, which is the transmission source of the check command, of an error (S414), and the movable body information management part 31 again carries out the processing in Step S400.

If a check command has not been received (No in S408), the command transmission control part 34 determines whether a control command along with a movable body ID has been received via the communication line 11 from a communication device 15 from another user 16 or not (S415 in FIG. 15). If a check command has not been received (No in S415), the movable body information management part 31 again carries out the processing in Step S400.

On the other hand, if a control command has been received (Yes in S415), the command transmission control part 34 identifies a movable body information table 351 corresponding to a movable body ID received along with the control command in the movable body information storage part 35. Then, the command transmission control part 34 determines whether movable body information 352 is registered to the identified movable body information table 351 or not (S416).

If movable body information 352 is registered to the identified movable body information table 351 (Yes in S416), the command transmission control part 34 notifies the communication device 15, which is the transmission source of the control command, of such a state that the movable-body-mounted apparatus 20 subject to control is out of communication area, and such a state that the control command can be transmitted also via a terminal device 40 (S417). Then, if the command transmission control part 34 is instructed to transmit the control command via a terminal device 40 (Yes in S418), the command transmission control part 34 transmits the control command to a terminal device 40 corresponding to a terminal address 354 in the identified movable body information table 351 (S419).

Then, if a response is received from the terminal device 40 (Yes in S420), the command transmission control part 34 transmits the received response to the communication device 15, which is the transmission source of the control command (S421), and the movable body information management part 31 again carries out the processing in Step S400. On the other hand, if there is no response from the terminal device 40 (No in S420), the command transmission control part 34 notifies the communication device 15, which is the transmission source of the control command, of an error (S422), and the movable body information management part 31 again carries out the processing in Step S400.

If movable body information 352 is not registered (No in S416), the command transmission control part 34 transmits the received control command to a movable-body-mounted apparatus 20 corresponding to the received movable body ID via the communication line 11 (S423). Then, if a response is received from the movable-body-mounted apparatus 20 (Yes in S424), the command transmission control part 34 transmits the received response to the communication device 15, which is the transmission source of the control command (S425), and the movable body information management part 31 again carries out the processing in Step S400. On the other hand, if there is no response from the movable-body-mounted apparatus 20 (No in S424), the command transmission control part 34 notifies the communication device 15, which is the transmission source of the control command, of an error (S425), and the movable body information management part 31 again carries out the processing in Step S400.

Figure 16:
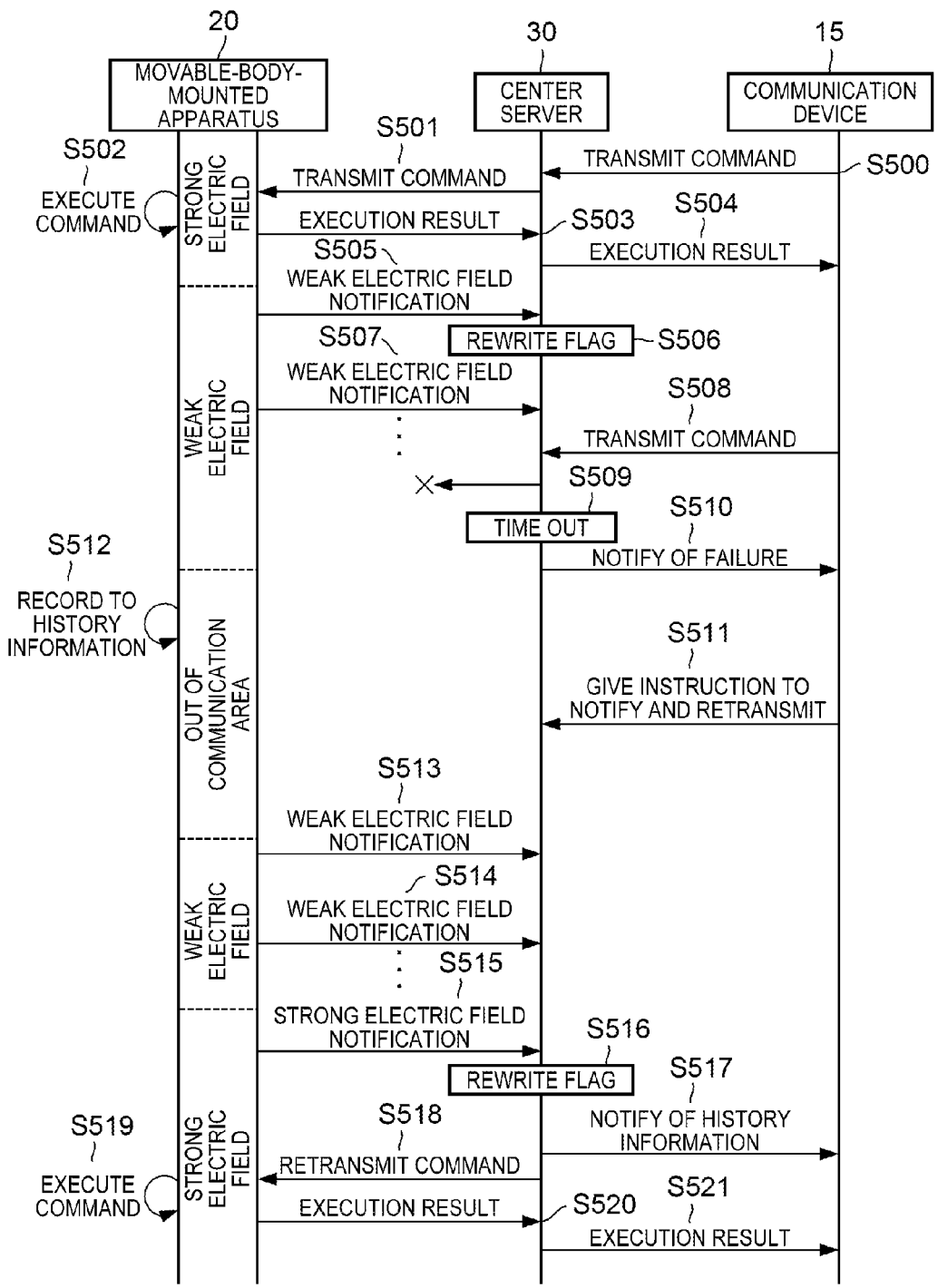
FIG. 16 is a sequence diagram illustrating an example of an operation of the communication system 10 according to the second embodiment.
Figure 17:
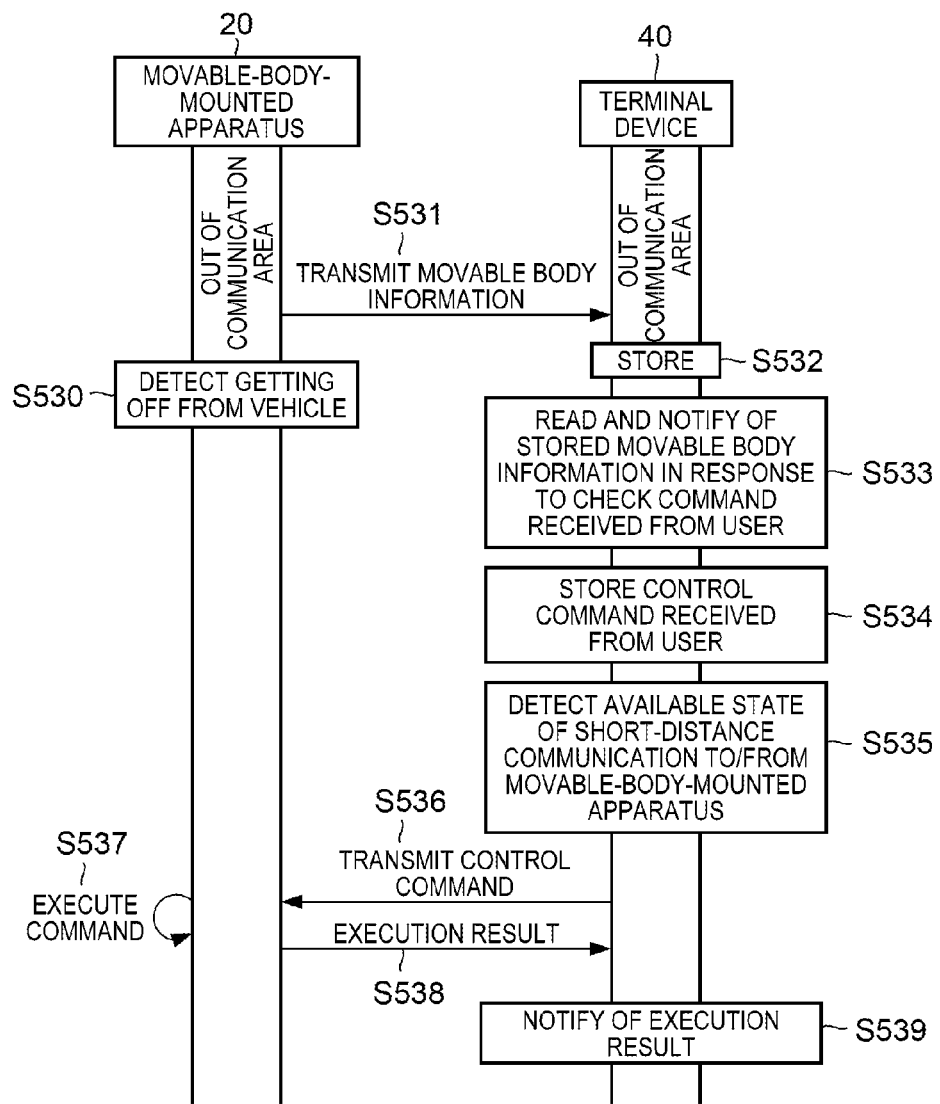
FIG. 17 is a sequence diagram illustrating an example of the operation of the communication system 10 according to the second embodiment.
Figure 18:
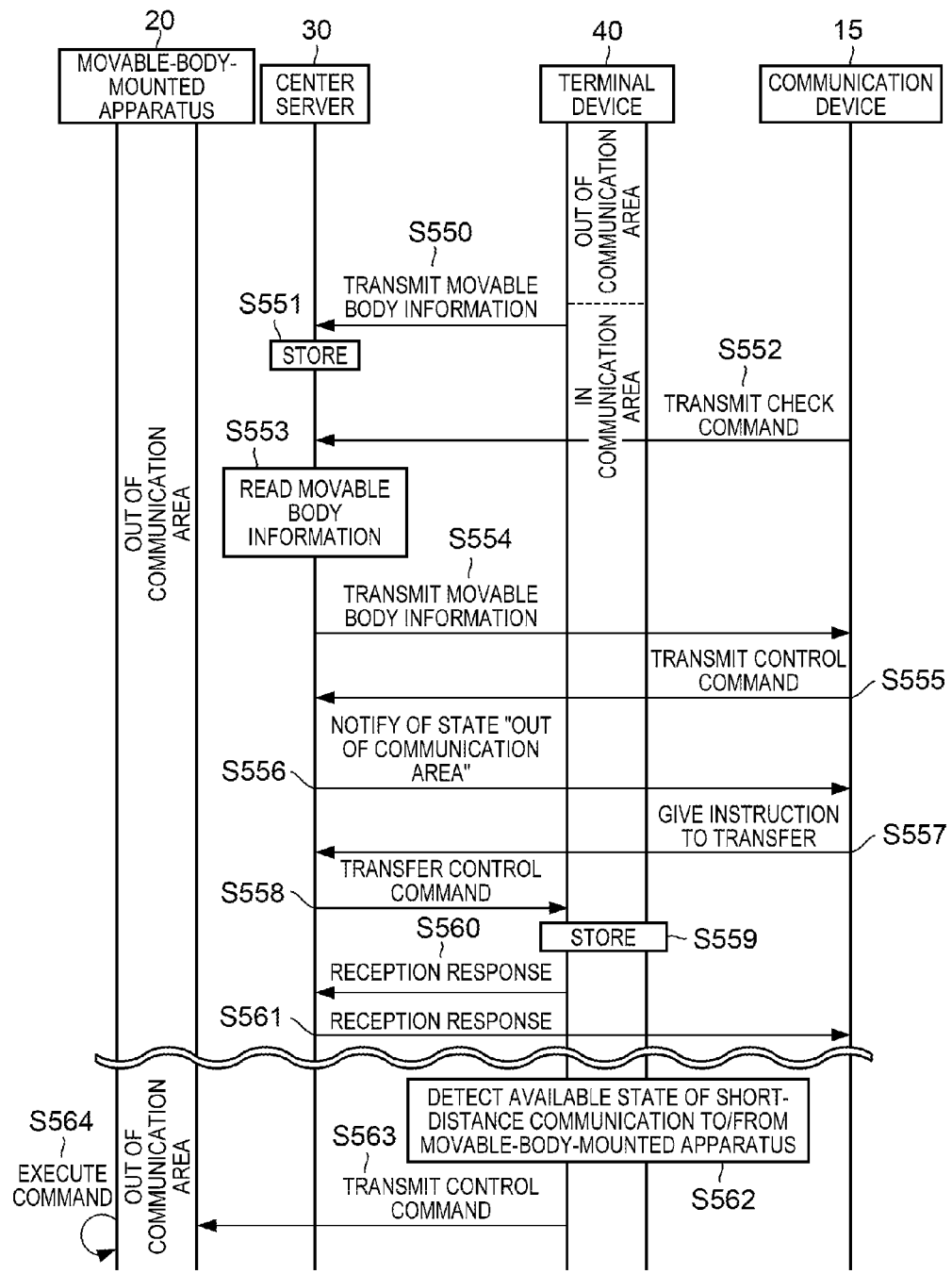
FIG. 18 is a sequence diagram illustrating an example of the operation of the communication system 10 according to the second embodiment.

FIGS. 16 to 18 are sequence diagrams illustrating an example of the operation of the communication system 10 according to the second embodiment. FIG. 16 illustrates an operation of the communication system 10 when the user 14 has not gotten off the vehicle 13.

First, if the movable-body-mounted apparatus 20 is in a communication area strong in electric field, when a check command or a control command is received from a communication device 15 of another user 16 (S500), because movable body information on a movable-body-mounted apparatus 20, which is a transmission destination of the command, is not registered to the movable body information storage part 35, the center server 30 transmits the received command to the movable-body-mounted apparatus 20 (S501). The movable-body-mounted apparatus 20 executes the received command (S502), and returns an execution result to the center server 30 (S503). The center server transfers the execution result received from the movable-body-mounted apparatus 20 to the communication device 15, which is the transmission source of the command (S504).

Then, when the movable-body-mounted apparatus 20 enters a communication area weak in electric field, the movable-body-mounted apparatus 20 records a time of the entrance into the weak electric field area to the history information, and transmits the weak electric field notification to the center server 30 (S505). The center server 30 rewrites the weak electric field flag to 1 in the movable body information table of the movable-body-mounted apparatus 20 (S506). While the movable-body-mounted apparatus 20 is in the communication area weak in electric field, the movable-body-mounted apparatus 20 periodically transmits the weak electric field notification to the center server 30 (S507).

When a check command or a control command is received from a communication device 15 of another user 16 (S508), because movable body information on the movable-body-mounted apparatus 20, which is a destination of the command, is not registered to the movable body information storage part 35, the center server 30 transmits the received command to the movable-body-mounted apparatus 20, but the movable-body-mounted apparatus 20 is in the communication area weak in electric field, and thus a command from the center server 30 may not be normally received.

In this case, the center server 30 detects that a response to the command has not been received in a predetermined period (S509), and notifies the communication device 15 of the transmission source of the command of the failure in the transmission of the command (S510). On this occasion, 1 is set as the weak electric field flag 353 in the movable body information table 351 corresponding to the movable-body-mounted apparatus 20 of the transmission destination of the command, and the center server 30 may thus also notify the communication device 15 of the possibility of the state "out of communication area" of the movable-body-mounted apparatus 20.

If notified of the error of the command, the another user 16 can issue, via the communication device 15, an instruction requesting the situation to be notified when the movable-body-mounted apparatus 20 returns to a state "strong in electric field", and an instruction requesting the command to be transmitted again when the movable-body-mounted apparatus 20 returns to the state "strong in electric field" (S511). When the center server 30 receives this instruction, the center server 30 registers a notification destination specified by the user 16 to the notification destination address in the movable body information table 351 corresponding to the movable-body-mounted apparatus 20 of the transmission destination of the command.

Then, when the movable-body-mounted apparatus 20 becomes out of communication area, the movable-body-mounted apparatus 20 records a time when the movable-body-mounted apparatus 20 has become out of communication area to the history information (S512). Then, when the movable-body-mounted apparatus 20 reenters a communication area weak in electric field, the movable-body-mounted apparatus 20 records a time of the entrance into the area weak in electric field to the history information, and transmits the weak electric field notification to the center server 30 (S513). While the movable-body-mounted apparatus 20 is in the communication area weak in electric field, the movable-body-mounted apparatus 20 periodically transmits the weak electric field notification to the center server (S514).

Then, when the movable-body-mounted apparatus 20 enters a communication area strong in electric field, the movable-body-mounted apparatus 20 records a time of the entrance into the area strong in electric field to the history information, and transmits the strong electric field notification to the center server 30 (S515). The center server 30 rewrites the weak electric field flag to 0 in a movable body information table of the movable-body-mounted apparatus 20 (S516).

Then, if a notification destination address is registered to the movable body information table of the movable-body-mounted apparatus 20, the center server 30 transmits the entrance of the movable-body-mounted apparatus 20 into the communication area strong in electric field, and history information representing the history of the radio wave situation included in the strong electric field notification to the notification destination address (S517). Moreover, if retransmission of the command is specified, the center sever 30 retransmits the command to the movable-body-mounted apparatus 20 (S518). The movable-body-mounted apparatus 20 executes the received command (S519), and returns an execution result to the center server 30 (S520). The center server 30 transfers the execution result received from the movable-body-mounted apparatus 20 to the communication device 15, which is the transmission source of the command (S521).

FIG. 17 is the sequence diagram representing an operation of the communication system 10 when the user 14 gets off the vehicle 13 in the state "out of communication area".

First, the movable-body-mounted apparatus 20 detects such a situation that the user 14 gets off the vehicle (S530), and because the radio wave intensity is in the state "out of communication area", the movable body information stored in the movable body information storage part 23 is transmitted to the terminal device 40 by means of the short-distance wireless communication (S531). The terminal device stores the movable body information received from the movable-body-mounted apparatus 20 in the movable body information storage part 406 (S532).

Then, when a check command is received from the user 14 of the terminal device 40, the terminal device 40 reads movable body information of which items is corresponding to the check command from the movable body information storage part 406, and notifies the user via the screen or the speaker installed on the terminal device (S533).

Moreover, when a control command is received from the user 14, the terminal device 40 stores the received control command in the command storage part 408 (S534). Then, if the available state of the short-distance wireless communication to/from the movable-body-mounted apparatus 20 is detected (S535), the terminal device 40 transmits the stored control command by means of the short-distance wireless communication to the movable-body-mounted apparatus 20 (S536).

The movable-body-mounted apparatus 20 executes the received control command (S537). Then, if the short-distance wireless communication to/from the terminal device 40 is available, the movable-body-mounted apparatus 20 may transmit an execution result to the terminal device 40 (S538). When the execution result of the control command is received from the movable-body-mounted apparatus 20, the terminal device 40 notifies the user 14 of the received execution result via the screen or the speaker installed on the terminal device (S539).

FIG. 18 is a sequence diagram illustrating an operation of the communication system 10 when the terminal device 40 which has received the movable body information from the movable-body-mounted apparatus 20 in the state "out of communication area" moves into a communication area.

First, the terminal device 40 detects the entrance into the communication area of the nearest base station 12, and transmits the movable body information received from the movable-body-mounted apparatus 20 along with the movable body ID of the movable-body-mounted apparatus 20 via the base station 12 to the center server 30 (S550). The center server 30 stores the received movable body information associated with the received movable body ID in the movable body information storage part 35 (S551).

Then, when a check command directed to the movable-body-mounted apparatus 20 is received from a communication device 15 of another user 16 (S552), because the movable body information corresponding to the movable body ID of the movable-body-mounted apparatus 20 is registered to the movable body information storage part 35, the center server 30 reads items of the movable body information corresponding to the check command from the movable body information storage part 35 (S553), and transmits the read movable body information to the communication device 15, which is the transmission source of the check command (S554).

Then, when a control command directed to the movable-body-mounted apparatus 20 is received from a communication device 15 of another user 16 (S555), because movable body information corresponding to a movable body ID of the movable-body-mounted apparatus 20 is registered to the movable body information storage part 35, the center server 30 notifies the communication device 15, which is the transmission source of the control command, of such a state that the movable-body-mounted apparatus 20, which is the transmission destination of the control command, is out of communication area (S556).

If an instruction to transfer the control command to a terminal device 40 is received from the communication device 15 (S557), the center server 30 transfers the control command to the terminal device 40 corresponding to a terminal address registered to the movable body information storage part 35 associated with the movable body ID of the movable-body-mounted apparatus 20, which is the transmission destination of the control command (S558).

The terminal device 40 stores the received control command in the command storage part 408 (S559), and returns a reception response to the center server 30 (S560). The center server 30 returns a reception response representing the normal transfer of the control command to the terminal device 40 to the communication device 15 (S561).

Then, if the available state of the short-distance wireless communication to/from the movable-body-mounted apparatus 20 is detected (S562), the terminal device 40 transmits the stored control command by means of the short-distance wireless communication to the movable-body-mounted apparatus 20 (S563). The movable-body-mounted apparatus 20 executes the received control command (S564).

Figure 19:
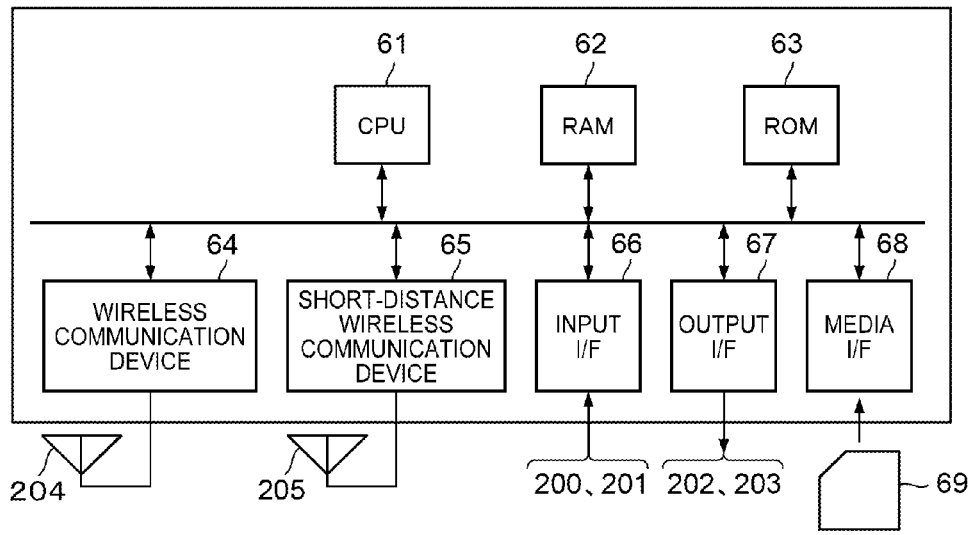
FIG. 19 is a diagram illustrating an example of a hardware configuration of a computer 60 realizing functions of the movable-body-mounted apparatus 20 according to the second embodiment.

FIG. 19 is a diagram illustrating an example of a hardware configuration of a computer 60 realizing functions of the movable-body-mounted apparatus 20 according to the second embodiment. The computer 60 includes a central processing unit (CPU) 61, a random access memory (RAM) 62, a read only memory (ROM) 63, a wireless communication device 64, a short-distance wireless communication device 65, an input interface (I/F) 66, an output interface (I/F) 67, and a media interface (I/F) 68.

The CPU 61 operates based on a program stored in the ROM 63, and carries out control for respective parts. The wireless communication device 64 provides the CPU 61 with data received via the antenna 204 from the base station 12 by means of the wide-area wireless communication such as a cellular phone or the WiMAX, and transmits data generated by the CPU 61 via the antenna 204 to the base station 12. The short-distance wireless communication device 65 provides the CPU 61 with data received via the antenna 205 from the terminal device 40 by means of the short-distance wireless communication such as the Bluetooth, the UWB, the Wi-Fi, the NFC, and the TransferJet, and transmits data generated by the CPU 61 via the antenna 205 to the terminal device 40.

The input interface 66 transmits to the CPU 61 the signals transmitted from the sensors 200 and 201. Moreover, the output interface 67 transmits data and a signal generated by the CPU 61 to the display device 202 and the speaker 203. Moreover, the output interface 67 transmits a control signal generated by the CPU 61 to the vehicle 13.

The CPU 61 reads via the media interface 68 a program stored in a medium 69, and installs the program in the ROM 63. The CPU 61 loads the program from the ROM 63 onto the RAM 62, and executes the loaded program. The medium 69 is, for example, a magnetic recording medium or a semiconductor memory.

The CPU 61 of the computer 60 executes the program loaded on the RAM 62, thereby realizing respective functions of the movable body information collection part 21, the wireless communication part 22, the command reception part 24, the command execution part 25, the separation determination part 26, the movable body information notification part 27, the communication availability determination part 28, and the short-distance communication part 29. Moreover, the RAM 62 stores data stored in the movable body information storage part 23.

The computer 60 reads and installs these programs from the medium 69, but, as another example, the computer 60 may acquire and install these programs via the wireless communication device 64.

Figure 20:
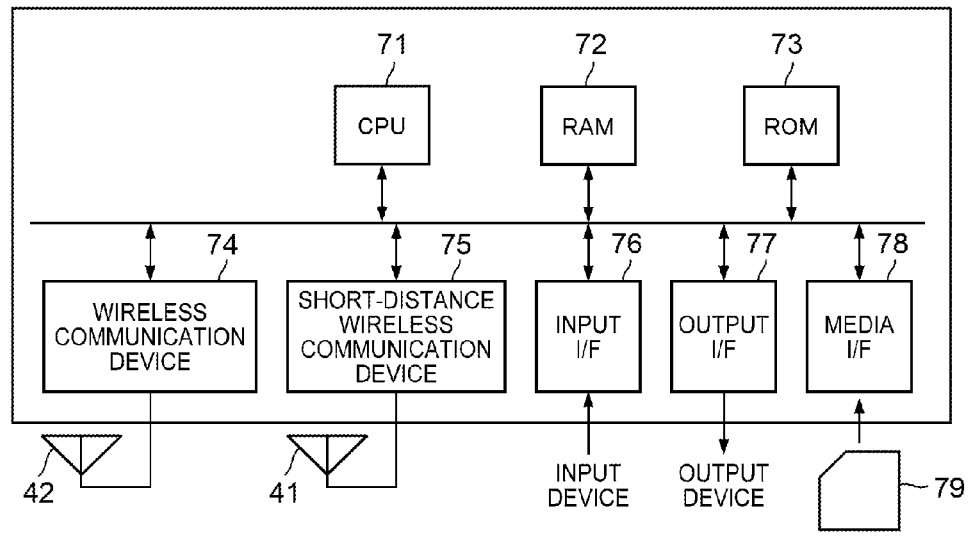
FIG. 20 is a diagram illustrating an example of a hardware configuration of a computer 70 realizing functions of the terminal device 40 according to the second embodiment.

FIG. 20 is a diagram illustrating an example of a hardware configuration of a computer 70 realizing functions of the terminal device 40 according to the second embodiment. The computer 70 includes a central processing unit (CPU) 71, a random access memory (RAM) 72, a read only memory (ROM) 73, a wireless communication device 74, a short-distance wireless communication device 75, an input interface (I/F) 76, an output interface (I/F) 77, and a media interface (I/F) 78.

The CPU 71 operates based on a program stored in the ROM 73, and carries out control for respective parts. The wireless communication device 74 provides the CPU 71 with data received via the antenna 42 from the base station 12 by means of the wide-area wireless communication such as a cellular phone or the WiMAX, and transmits data generated by the CPU 71 via the antenna 42 to the base station 12. The short-distance wireless communication device 75 provides the CPU 71 with data received via the antenna 41 from the movable-body-mounted apparatus 20 by means of the short-distance wireless communication such as the Bluetooth, the UWB, the Wi-Fi, the NFC, and the TransferJet, and transmits data generated by the CPU 71 via the antenna 41 to the movable-body-mounted apparatus 20.

The input interface 76 transmits to the CPU 71 a signal transmitted from an input device. Moreover the output interface 77 transmits data and a signal generated by the CPU 71 to an output device. The CPU 71 reads via the media interface 78 a program stored in a medium 79, and installs the program in the ROM 73. The CPU 71 loads the program from the ROM 73 onto the RAM 72, and executes the loaded program. The medium 79 is, for example, a magnetic recording medium or a semiconductor memory.

The CPU 71 of the computer 70 executes the program loaded on the RAM 72, thereby realizing respective functions of the short-distance communication part 400, the movable body information reception part 401, the movable body information transmission part 402, the wireless communication part 403, the short-distance communication availability determination part 404, the command transmission control part 405, the communication availability determination part 407, the command reception part 409, and the movable body information notification part 410. Moreover, the RAM 72 stores data stored in the movable body information storage part 406 and the command storage part 408.

The computer 70 reads and installs these programs from the medium 79, but, as another example, the computer 70 may acquire and install these programs via the wireless communication device 74.

Figure 21:
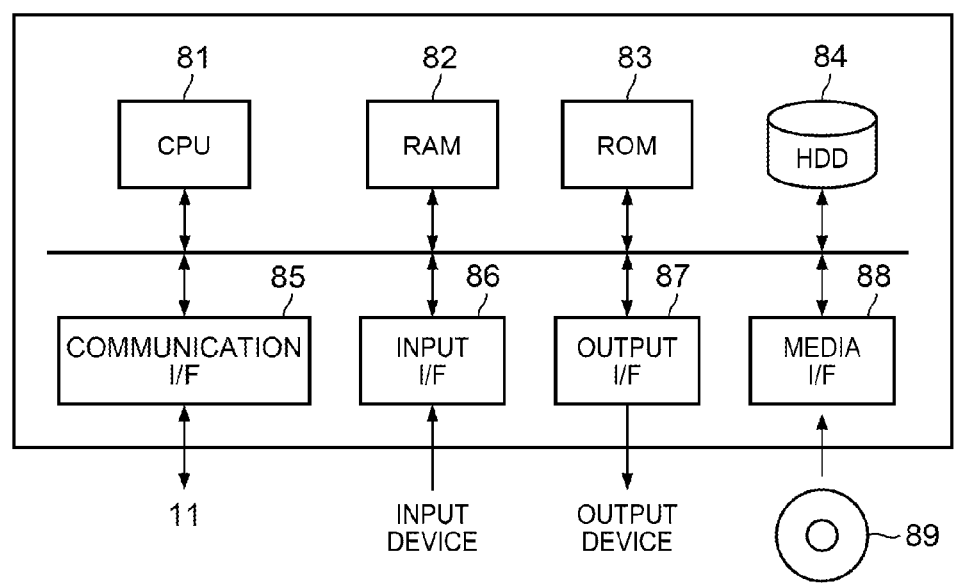
FIG. 21 is a diagram illustrating an example of a hardware configuration of a computer 80 realizing functions of the center server 30 according to the second embodiment.

FIG. 21 is a diagram illustrating an example of a hardware configuration of a computer 80 realizing functions of the center sever 30 according to the second embodiment. The computer 80 includes a central processing unit (CPU) 81, a random access memory (RAM) 82, a read only memory (ROM) 83, a hard disk drive (HDD) 84, a communication interface (I/F) 85, an input interface (I/F) 86, an output interface (I/F) 87, and a media interface (I/F) 88.

The CPU 81 operates based on a program stored in the ROM 83 or the HDD 84, and carries out control for respective parts. The ROM 83 stores a boot program executed by the CPU 81 when the computer 80 starts up, programs depending on hardware of the computer 80, and the like. The HDD 84 stores programs executed by the CPU 81, data used by the programs, and the like.

The communication interface 85 receives data from another device via the communication line 11, transmits the received data to the CPU 81, and transmits data generated by the CPU 81 to the another device via the communication line 11.

The input interface 86 transmits to the CPU 81 the signal transmitted from the input device. Moreover, the output interface 87 transmits data and a signal generated by the CPU 81 to the output device. The CPU 81 reads via the media interface 88 a program stored in a medium 89, and installs the program in the HDD 84. The CPU 81 loads the program from the HDD 84 onto the RAM 82, and executes the loaded program. The medium 89 is, for example, a magnetic recording medium or a semiconductor memory.

The CPU 81 of the computer 80 executes the program loaded on the RAM 82, thereby realizing respective functions of the movable body information management part 31, the movable body information reception part 32, the movable body information reply part 33, and the command transmission control part 34. Moreover, the RAM 82 or the HDD 84 stores data stored in the movable body information storage part 35.

The computer 80 reads and installs these programs from the medium 89, but, as another example, the computer 80 may acquire and install these programs via the communication interface 85.

The second embodiment of the present invention has been described.

As apparent from the above description, according to the communication system 10 of this embodiment, in a case where the movable-body-mounted apparatus 20 is out of the communication area, when the user 14 gets off the vehicle 13, even if the movable-body-mounted apparatus 20 is out of the communication area, the state of the vehicle 13 can be checked at a location remote from the vehicle 13 by transferring the movable body information in the movable-body-mounted apparatus 20 to the terminal device 40 of the user 14.

Moreover, when the terminal device 40, which has received the movable body information from the movable-body-mounted apparatus 20, comes to be able to communicate to/from the base station 12, the terminal device 40 registers the movable body information via the base station 12 to the center server 30, and hence even if the movable-body-mounted apparatus 20 is out of the communication area, the center server 30 can return the movable body information when the center server 30 receives an inquiry for the movable body information from another user 16.

Moreover, the center server 30 transfers a control command received from another user 16 to the terminal device 40, and when the short-distance wireless communication to/from the movable-body-mounted apparatus 20 becomes available, the terminal device 40 transmits the control command to the movable-body-mounted apparatus 20, and hence even if the movable-body-mounted apparatus 20 is out of the communication area, the control command from the another user 16 can be transmitted to the movable-body-mounted apparatus 20.

Note that, the present invention is not limited to the above-mentioned respective embodiments, and can include various modified examples thereof.

For example, in the second embodiment, when the received signal quality is a quality corresponding to the weak electric field, the movable-body-mounted apparatus 20 periodically transmits the weak electric field notification representing the signal quality to the center server 30, and, when the received signal quality becomes a quality corresponding to the strong electric field, transmits the strong electric field notification representing the quality and the history of the radio wave state up to then to the center server 30, but the same operation may be carried out in the first embodiment.

Moreover, in the second embodiment, when the user 14 gets off the vehicle 13, if the state is out of communication area, the movable-body-mounted apparatus 20 transmits the movable body information by means of the short-distance wireless communication to the terminal device 40, but, as another form, even if the state is not out of communication area, when the user 14 gets off the vehicle 13, the movable-body-mounted apparatus 20 may transmit the movable body information by means of the short-distance wireless communication to the terminal device 40.

As a result, the user 14 of the terminal device 40 can acquire the movable body information from the movable-body-mounted apparatus 20 by transmitting a check command via the center server 30 to the movable-body-mounted apparatus 20, but even without performing the communication, the user can check the state of the vehicle 13 by referring to the movable body information already stored in the terminal device 40. As a result, communication cost required for checking the state of the vehicle 13 can be saved. Further, even if the terminal device 40 exits from the communication area of the base station 12, the user 14 can check the state of the vehicle 13.

Moreover, in the second embodiment, if the received signal quality is a quality corresponding to the weak electric field, the movable-body-mounted apparatus 20 periodically transmits the weak electric field notification representing the situation to the center server 30, but the movable-body-mounted apparatus 20 may further transmit the weak electric field notification including the movable body information to the center server 30. As a result, the center server 30 can respond more quickly to an inquiry for the movable body information received from another user 16 until the notification of the movable body information from the terminal device 40.

Moreover, in the second embodiment, the communication availability determination part 28 of the movable-body-mounted apparatus 20 and the communication availability determination part 407 of the terminal device 40 determine whether the radio wave intensity corresponds to the state "strong in electric field", the state "weak in electric field", or the state out of communication area based on the quality measured from the signal actually received from the base station 12, but the present invention is not limited to this configuration.

For example, the communication availability determination part 28 and the communication availability determination part 407 may hold in advance a map representing a distribution of communication areas provided by communication carriers, may calculate a position of the own device by means of the GPS signals, and may determine whether the position of the own device is included in the communication area or not, thereby determining whether the position is inside or outside the communication area. Moreover, even if the position is in the communication area, if the distance is short to a boarder of the communication area, the radio wave intensity may be determined to correspond to the weak electric field, and if the distance is long, the radio wave intensity may be determined to correspond to the strong electric field.

Moreover, if a travel route is known in advance, the movable-body-mounted apparatus 20 refers to the map representing the distribution of the communication area held in advance, and if a section corresponding to out of communication area exists on the route ahead, the movable-body-mounted apparatus 20 may transmit the movable body information to the center server 30 in advance before the entrance to the section corresponding to out of communication area. Moreover, in combination with this configuration, the movable-body-mounted apparatus 20 preferably acquires updates of map information, traffic congestion information, and the like from the center server 30 before the entrance to the section corresponding to out of communication area.

Moreover, in the second embodiment, when the user 14 gets off the vehicle 13, if the state is out of communication area, the movable-body-mounted apparatus 20 transmits the movable body information to the terminal device 40 by means of the short-distance wireless communication, but the movable-body-mounted apparatus 20 does not need to transmit the entire movable body information to the terminal device 40, but only needs to transmit items of the movable body information specified by an administrator or the user 14 to the terminal device 40.

Moreover, in the second embodiment, when the terminal device 40 enters the communication area of the base station 12, the terminal device 40 transmits the movable body information received from the movable-body-mounted apparatus 20 to the center server 30, but the present invention is not limited to this configuration, and the terminal device 40 may transmit movable body information received from the movable-body-mounted apparatus 20 to a transmission destination specified in advance by the user 14 by means of an electronic mail or the like.

Moreover, in the second embodiment, the separation determination part 26 is provided in the movable-body-mounted apparatus 20, and the separation determination part 26 determines whether the user 14 gets off the vehicle 13 or not based on the signal transmitted from the sensor 201. When the movable body information notification part 27 is notified of such a situation that the user 14 has gotten off the vehicle 13 from the separation determination part 26, if the movable body information notification part 27 has been notified of a change to the state "out of communication area" from the communication availability determination part 28, the movable body information notification part 27 reads the movable body information from the movable body information storage part 23, and transmits the movable body information along with the movable body ID of the own device via the short-distance communication part 29 to the terminal device 40, but the present invention is not limited to this configuration.

For example, a separation determination part may be provided on the terminal device 40, and the separation determination part may determine whether the user 14 has gotten off the vehicle 13 or not based on a signal transmitted from a sensor installed on the terminal device 40. When the movable body information reception part 401 is notified of such a situation that the user 14 has gotten off the vehicle 13 from the separation determination part, the movable body information reception part 401 may communicate via the short-distance communication part 400 to/from the movable body information notification part 27 in the movable-body-mounted apparatus 20, and may acquire the movable body information read by the movable body information notification part 27 from the movable body information storage part 23 along with a movable body ID of the movable-body-mounted apparatus 20 from the movable body information notification part 27.

On this occasion, if the separation determination part provided in the terminal device 40 detects disconnection of a wired or wireless connection established to an electronic device registered in advance by detecting unplugging of a communication cable or a disconnection of, for example, an established wireless communication link to the electronic device registered in advance such as the movable-body-mounted apparatus 20 by means of the NFC or the TransferJet, the separation determination part provided in the terminal device 40 may determine that the user 14 has gotten off the vehicle 13.

Moreover, in the second embodiment, when the command transmission control part 34 receives, via the communication line 11, a control command along with a movable body ID from a communication device 15 of another user 16, if movable body information 352 is not registered to a movable body information table 351 corresponding to the movable body ID, the command transmission control part 34 acquires an approval from the user 16, and then transmits the received control command to a terminal device 40 corresponding to the terminal address 354 in the movable body information table 351. On this occasion, the command transmission control part 34 associates the identification information on the transmitted control command with the movable body ID, and holds the identification information.

Moreover, when the command reception part 409 in the terminal device 40 receives a control command via the wireless communication part 403 from the center server 30, the command reception part 409 associates the received control command with the identification information on the control command, and stores the control command in the command storage part 408. Then, if the command transmission control part 405 has been notified of the available state of the short-distance wireless communication to/from the movable-body-mounted apparatus 20 from the short-distance communication availability determination part 404, the command transmission control part 405 reads the control command and the identification information from the command storage part 408, and transmits the read control command via the short-distance communication part 400 to the movable-body-mounted apparatus 20.

When the command reception part 24 of the movable-body-mounted apparatus 20 receives the control command via the short-distance communication part 29 from the terminal device 40, the command reception part 24 transmits the received control command to the command execution part 25, and receives an execution result from the command execution part 25. Then, the command reception part 24 transmits the execution result along with the identification information on the executed control command to the communication availability determination part 28. Moreover, the command reception part 24 transmits the execution result along with the movable body ID of the own device and the identification information on the executed control command via the short-distance communication part 29 to the terminal device 40.

If the received signal quality changes to the quality corresponding to the strong electric field, the communication availability determination part 28 includes, in the strong electric field notification, the held history information, information on the change in state to the strong electric field, the movable body ID of the own device, the identification information on the control command received from the command reception part 24, and the execution result, and transmits the strong electric field notification via the wireless communication part 22 to the center server 30.

Moreover, if the movable body information transmission part 402 of the terminal device 40 receives the movable body ID, the identification information on the control command, and the execution result via the short-distance communication part 400 from the movable-body-mounted apparatus 20, the movable body information transmission part 402 holds these pieces of information, and transmits the held movable body ID, the identification information on the control command, and the execution result via the wireless communication part 403 to the center server 30, when the movable body information transmission part 402 is notified of an available state of the communication to/from the nearest base station 12 by the communication availability determination part 407.

When the command transmission control part 34 of the center server 30 receives the identification information on the control command and the execution result from the terminal device 40, the command transmission control part 34 deletes the same identification information as the identification information on the received control command from held identification information on control commands, and transmits the received execution result to the communication device 15 of the user 16 of the transmission source of the control command.

Moreover, when the command transmission control part 34 of the center server 30 receives a strong electric field notification from the movable-body-mounted apparatus 20, the command transmission control part 34 determines whether identification information on a control command is included in the strong electric field notification or not. If the identification information on the control command is not included in the strong electric field notification, when the command transmission control part 34 holds the identification information on a control command directed to the movable-body-mounted apparatus 20, which is the transmission source of the strong electric field notification, associated with the movable body ID of the movable-body-mounted apparatus 20, the command transmission control part 34 retransmits the control command corresponding to the identification information to the movable-body-mounted apparatus 20.

On this occasion, if identification information on a control command is not included in the strong electric field notification, this situation means that the control command transmitted to the terminal device 40 when the movable-body-mounted apparatus 20 was out of communication area was not transferred to the movable-body-mounted apparatus 20 while the movable-body-mounted apparatus 20 was out of communication area. As a result, the command transmission control part 34 retransmits the control command corresponding to the held identification information to the movable-body-mounted apparatus 20.

On the other hand, if identification information on a control command is included in the strong electric field notification, when the identification information matches identification information on a control command held by the command transmission control part 34 and associated with the movable body ID of the terminal device 40, the command transmission control part 34 does not retransmit the control command corresponding to the held identification information to the movable-body-mounted apparatus 20, and deletes the control command.

In this way, even if a control command which was transmitted to the terminal device 40 when the movable-body-mounted apparatus 20 was out of communication area was not transferred to the movable-body-mounted apparatus 20 while the movable-body-mounted apparatus 20 was out of communication area, when the movable-body-mounted apparatus 20 enters the range, the control command can be retransmitted to the movable-body-mounted apparatus 20. As a result, for example, in a case where a parking space of a residence is out of communication area, one day, a father comes home by driving the vehicle 13, the movable body information is transferred to a terminal device 40a when the father gets off the vehicle, and a mother gets on the vehicle 13 while carrying an own terminal device 40b next day and leaves home, when a movable-body-mounted apparatus 20 of the vehicle 13 returns to the range before a control command is received from the terminal device 40a although the control command was transferred to the terminal device 40a of the father when the terminal device 40a entered the communication area again, the control command can be executed by the movable-body-mounted apparatus 20 by transmitting the control command to the movable-body-mounted apparatus 20 when the movable-body-mounted apparatus 20 returns to the range without waiting for reception of the control command from the terminal device 40a.

The identification information on the control command is unique information so that even if a plurality of commands are the same in type of control such as "increasing the temperature of the air conditioner by one degree", and the same commands are transmitted by different users, or the same user transmits the same command a plurality of times, the respective commands transmitted a plurality of times can be discriminated. Therefore, if control commands same in identification information are received, the command execution part 25 of the movable-body-mounted apparatus 20 executes only the control command having the identification information received first.

Therefore, for example, in the case where the control command retransmitted from the center server 30 is executed first, even if the control command same in identification information is received later from the terminal device 40 when the short-distance communication to/from the movable-body-mounted apparatus 20 becomes available, the command execution part 25 of the movable-body-mounted apparatus 20 does not execute the control command. Therefore, the control command can be prevented from being executed a plurality of times, which is not intended by the user.

Moreover, the command transmission control part 34 may hold the identification information on a transmitted control command along with a time of reception of the command associated with a movable body ID, and may stop retransmission of a control command for which a predetermined period (such as a period of one week or more) has elapsed since the reception. The predetermined period may be set in advance or may be specified by the user. As a result, an old control command for which a certain period or more has elapsed since an instruction on the transmission of the control command was given can be prevented from being executed.

Moreover, when the command reception part 409 of the terminal device 40 receives a control command and identification information via the wireless communication part 403 from the center server 30, the command reception part 409 associates these pieces of information with a time of reception, and stores the information in the command storage part 408. Then, even if the command transmission control part 405 has been notified of the available state of the short-distance wireless communication to/from the movable-body-mounted apparatus 20 by the short-distance communication availability determination part 404, the command transmission control part 405 does not transmit a control command for which a predetermined period (such as a period of one week or more) has elapsed since the reception to the movable-body-mounted apparatus 20, and deletes the control command from the command storage part 408. The predetermined period may also be set in advance or may be specified by the user. As a result, an old control command for which a certain period or more has elapsed since an instruction on the transmission of the control command was given can be prevented from being executed.

Moreover, the above-mentioned respective embodiments are detailed for the sake of description easy to understand, and the present invention is not limited to a case including all the described components. Moreover, a part of a configuration of a certain embodiment can be replaced by a configuration of another embodiment, and to a configuration of a certain embodiment, a configuration of another embodiment can be added. Moreover, another component can be added to, be removed from, or replace a part of the configuration of each of the embodiments.

Moreover, the respective configurations, functions, processing parts, processing means, and the like in part or entirety may be realized as hardware by designing integrated circuits. Moreover, the respective configurations, functions, and the like may be realized as software by a processor interpreting and executing programs realizing the respective functions. Programs, tables, files, and the like for realizing the respective functions may be stored in a recording device such as a memory, a hard disk, and a solid state drive (SSD), or a recording medium such as an IC card, an SD card, and a DVD.

Moreover, control lines or information lines considered necessary for description are described above, and not all control lines and information lines are necessarily described above for the sake of nature of products. It may be considered that almost all configurations are actually mutually connected to each other.

REFERENCE SIGNS LIST

10 . . . communication system, 11 . . . communication line, 12 . . . base station, 13 . . . vehicle, 14 . . . user, 15 . . . communication device, 16 . . . user, 20 . . . movable-body-mounted apparatus, 21 . . . movable body information collection part, 22 . . . wireless communication part, 23 . . . movable body information storage part, 24 . . . command reception part, 25 . . . command execution part, 26 . . . separation determination part, 27 . . . movable body information notification part, 28 . . . communication availability determination part, 29 . . . short-distance communication part, 200 . . . sensor, 201 . . . sensor, 202 . . . display device, 203 . . . speaker, 204 . . . antenna, 30 . . . center server, 31 . . . movable body information management part, 32 . . . movable body information reception part, 33 . . . movable body information reply part, 34 . . . command transmission control part, 35 . . . movable body information storage part, 40 . . . terminal device, 400 . . . short-distance communication part, 401 . . . movable body information reception part, 402 . . . movable body information transmission part, 403 . . . wireless communication part, 404 . . . short-distance communication availability determination part, 405 . . . command transmission control part, 406 . . . movable body information storage part, 407 . . . communication availability determination part, 408 . . . command storage part, 409 . . . command reception part, 410 . . . movable body information notification part, 41 . . . antenna, 42 . . . antenna

The invention claimed is:
1. A communication system, comprising:
a movable-body-mounted apparatus that is mounted on a movable body; and
a terminal device to be used by a user who moves along with the movable body;

wherein the movable-body-mounted apparatus comprises:
a vehicle information storage part configured to store movable body information, wherein the movable body information includes a received signal quality of a radio wave used for communication to/from a center server;
a vehicle availability determination part configured to transmit a notification to the center server when communication to/from the center server has changed from being unavailable to being available; and
a vehicle separation determination part configured to determine whether the user is separated from the movable body;
a vehicle information transmission part configured to transmit the movable body information to the terminal device, when the vehicle separation determination part determines that the user is separated from the movable body;
wherein the terminal device comprises:
a terminal information reception part configured to receive the movable body information;
a terminal information storage part configured to store the movable body information received by the terminal information reception part; and
a terminal information notification part configured to retrieve user information stored in the terminal information storage part in response to an input from the user; and
wherein the center server comprises:
a server information reception part configured to receive the notification from one or more movable-body-mounted apparatuses,
a server information storage part configured to store a movable body information table, wherein the movable body information table includes the movable body information for each of the one or more movable-body-mounted apparatuses; and
a server information management part configured to delete the movable body information from the movable body information table for a particular movable-body-mounted apparatus when the notification received from the particular movable-body-mounted apparatus indicates that communication to/from the center server has changed from being unavailable to being available.

2. The communication system according to claim 1, further comprising:
a vehicle information notification part configured to transmit the movable body information to the terminal device, when:
the vehicle availability determination part determines that communication to/from the center server is unavailable, and
the terminal device is separated from the movable-body-mounted apparatus.

3. The communication system according to claim 2,
wherein the vehicle availability determination part is further configured to determine whether communication to/from the center server is available;
wherein the vehicle information transmission part is further configured to transmit the movable body information to the center server when the vehicle availability determination part determines that communication to/from the center server is available; and
wherein the center server further comprises
a server information reply part configured to retrieve movable body information from the movable body information table and transmit the movable body information to an additional communication device when an inquiry for movable body information is received from the additional communication device.

4. The communication system according to claim 3, wherein the terminal device further comprises:
a terminal availability determination part configured to determine whether communication to/from the movable-body-mounted apparatus is available
a terminal command reception part configured to receive a command for controlling the movable-body-mounted apparatus from the user;
a terminal command storage part configured to store the command; and
wherein the center server further comprises a server command transmission control part configured to:
in response to the terminal command reception part receiving the command, transmit the command to the movable-body-mounted apparatus when the terminal availability determination part determines that communication to/from the movable-body-mounted apparatus is available; and
in response to the terminal command reception part receiving the command, temporarily store the command in the command storage part when the terminal availability determination part determines that communication to/from the movable-body-mounted apparatus is not available, and transmit the command to the movable-body-mounted apparatus when communication to/from the movable-body-mounted apparatus becomes available.

5. The communication system according to claim 4,
wherein the server information storage part is further configured to store identification information on the terminal device which has transmitted the movable body information;
wherein the server command transmission control part is further configured to:
transmit the command to the terminal device based on the identification information and the command is received in the terminal command reception part.

6. A movable-body-mounted apparatus, which is mountable on a movable body, comprising:
a movable body information storage part configured to store movable body information including a received signal quality of a radio wave used for communication to/from a center server;
a separation determination part configured to determine whether a terminal device to be used by a user is separated from the movable body;
a movable body information notification part configured to transmit the movable body information to the user when the separation determination part determines that the user is separated from the movable body,
a vehicle information transmission part configured to transmit the movable body information to a server information reception part of the center server, wherein the center server stores the movable body information for one or more movable-body-mounted apparatuses in a movable-body information table, and
a vehicle availability determination part configured to transmit a notification to the server that communication to/from the center server has changed from being unavailable to being available;
wherein in response to the notification, a server information management part is configured to delete the movable body information about a particular movable body from the movable-body information table.

7. The movable-body-mounted apparatus according to claim 6, wherein the movable body information notification part transmits movable body information to the terminal device, thereby notifying the user of the movable body information, when the separation determination part determines that the terminal device is separated from the movable-body-mounted apparatus.

8. The movable-body-mounted apparatus according to claim 7, further comprising a communication availability determination part which determines whether communication to/from the center server is available, wherein the movable body information notification part transmits movable body information to the terminal device when the communication availability determination part determines that communication to/from the center server is unavailable, and the terminal device is separated from the movable-body-mounted apparatus.

9. A center server, comprising:

a movable body information reception part configured to receive movable body information from a terminal device, wherein the movable body information includes a received signal quality of a radio wave;

a server information storage part configured to receive movable body information received by the movable body information reception part from one or more movable-bodies; and a movable body information reply part configured to retrieve the movable body information from a movable body information table stored within the server information storage part and transmit the movable body information to an additional communication device an inquiry for movable body information from additional communication device is received, a notification reception part that is configured to receive a notification from a particular movable-body-mounted apparatus indicates that communication to/from the center server has changed from being unavailable to being available; and a movable body information management part configured to delete the movable body information from the movable body information table for the particular movable-body-mounted apparatus when the notification received from the particular movable-body-mounted apparatus indicates that communication to/from the center server has changed from being unavailable to being available.

\* \* \* \* \*